United States Patent
Kim et al.

(10) Patent No.: US 10,757,722 B2
(45) Date of Patent: Aug. 25, 2020

(54) METHOD FOR ALLOWING WIRELESS RESOURCE TO BE ALLOCATED IN WIRELESS COMMUNICATION SYSTEM, AND DEVICE THEREFOR

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR); Hyukjin Chae, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/088,420

(22) PCT Filed: Mar. 24, 2017

(86) PCT No.: PCT/KR2017/003209
§ 371 (c)(1),
(2) Date: Sep. 25, 2018

(87) PCT Pub. No.: WO2017/164698
PCT Pub. Date: Sep. 28, 2017

(65) Prior Publication Data
US 2019/0116608 A1    Apr. 18, 2019

Related U.S. Application Data

(60) Provisional application No. 62/331,410, filed on May 3, 2016, provisional application No. 62/329,213, filed
(Continued)

(51) Int. Cl.
*H04W 72/12* (2009.01)
*H04W 72/04* (2009.01)
(Continued)

(52) U.S. Cl.
CPC ....... *H04W 72/1263* (2013.01); *H04W 72/04* (2013.01); *H04W 4/46* (2018.02); *H04W 24/10* (2013.01)

(58) Field of Classification Search
CPC .......................... H04W 72/04; H04W 72/1263
See application file for complete search history.

(56) References Cited

U.S. PATENT DOCUMENTS

2011/0103327 A1   5/2011   Lee et al.
2015/0065154 A1*  3/2015   Van Phan ........... H04W 72/042
                                                    455/450
(Continued)

FOREIGN PATENT DOCUMENTS

KR   1020100102686   9/2010
WO   2013131264      9/2013
WO   2014009483      1/2014

OTHER PUBLICATIONS

PCT International Application No. PCT/KR2017/003209, International Search Report dated Jul. 5, 2017, 4 pages.
(Continued)

*Primary Examiner* — Gary Mui
(74) *Attorney, Agent, or Firm* — Lee Hong Degerman Kang & Waimey

(57) ABSTRACT

A method for allowing a wireless resource to be allocated in a wireless communication system, and a device therefor are disclosed. Particularly, a method by which a terminal allows a wireless resource to be allocated in a wireless communication system can comprise the steps of: receiving, from a base station, one or more pieces of semi-persistent scheduling (SPS) configuration information comprising semi-persistent resource allocation information; receiving, from the base station, an SPS activation on specific SPS configuration information among the one or more pieces of SPS configuration information; allowing a specific SPS resource
(Continued)

to be allocated on the basis of the specific SPS configuration information; and reporting, to the base station, information indicating a transmission state of the one or more pieces of SPS configuration information when a transmission of an SPS message using the specific SPS resource is stopped.

9 Claims, 23 Drawing Sheets

Related U.S. Application Data on Apr. 29, 2016, provisional application No. 62/313,155, filed on Mar. 25, 2016.

(51) Int. Cl.
*H04W 24/10* (2009.01)
*H04W 4/46* (2018.01)

(56) References Cited

U.S. PATENT DOCUMENTS

| | | | |
|---|---|---|---|
| 2016/0302224 A1* | 10/2016 | Khairmode | H04L 5/0055 |
| 2017/0019881 A1* | 1/2017 | Cao | H04W 76/14 |
| 2017/0026942 A1* | 1/2017 | Vajapeyam | H04W 72/042 |
| 2019/0029006 A1* | 1/2019 | Wang | H04W 72/042 |
| 2019/0045507 A1* | 2/2019 | Sorrentino | H04W 48/12 |

OTHER PUBLICATIONS

LG Electronics, "Summary of V2V offline summary", R1-161405, RAN WG1 Meeting #84, Feb. 2016, 2 pages.

\* cited by examiner (a)

(b)

(a) Single CC                    (b) Multiple CC (a) Radio resource use_type 1

(b) Radio resource use_type 2

METHOD FOR ALLOWING WIRELESS RESOURCE TO BE ALLOCATED IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/003209, filed on Mar. 24, 2017, which claims the benefit of U.S. Provisional Application No. 62/313,155, filed on Mar. 25, 2016, 62/329,213, filed on Apr. 29, 2016 and 62/331,410, filed on May 3, 2016, the contents of which are all hereby incorporated by reference herein in their entirety.

TECHNICAL FIELD

The present invention relates to wireless communications, and more particularly, to a method for a User Equipment to receive an allocation of radio resource from a base station and an apparatus for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

During a process that a User Equipment receives an allocation of resource in SPS scheme from a base station and transmits SPS data, a problem that the fluctuation of SPS transmission situation occurs may occur.

In order to solve the problem above, the present invention proposes a method for activating SPS resource in an eNB indication mode.

Particularly, in the case that a plurality of SPS configurations is activated, the present invention is to propose a method of receiving allocation of a single SPS resource or a plurality of SPS resources.

In addition, the present invention proposes a method for releasing SPS resource according to a specific triggering condition and/or a reporting of a User Equipment in the eNB indication mode.

In addition, the present invention proposes a method for a User Equipment to report information indicating a transmission state of one or more types of SPS configuration information according to whether resource for a specific SPS configuration is used.

Technical objects to be achieved by the present invention are not limited to the aforementioned technical objects, and other technical objects not described above may be evidently understood by a person having ordinary skill in the art to which the present invention pertains from the following description.

Technical Solution

According to an embodiment of the present invention, a method for receiving allocation of a radio resource performed by a User Equipment includes receiving, from a base station, one or more Semi-Persistent Scheduling (SPS) configuration information including semi-persistent resource allocation information, receiving, from the base station, SPS activation for specific SPS configuration information among the one or more SPS configuration information, receiving allocation of a specific SPS resource based on the specific SPS configuration information, and when a transmission signal of an SPS message using the specific SPS resource is terminated, reporting, to the base station, information for a transmission state of the one or more SPS configuration information, and the information for the transmission state of the one or more SPS configuration information includes activation indication information related to the one or more SPS configuration information, or release indication information related to the one or more SPS configuration information.

In addition, preferably, the one or more SPS configuration information may be reported through at least one of a specific physical control channel or a specific physical data channel.

In addition, preferably, the information for the transmission state of the one or more SPS configuration information may include bitmap information for the transmission state of the one or more SPS configuration information.

In addition, preferably, the information for the transmission state of the one or more SPS configuration information may include an index value of the SPS configuration information.

In addition, preferably, when the wireless communication system supports vehicle to everything (V2V) communication, the SPS message may include a V2V SPS message.

In addition, preferably, when a transmission of the SPS message using the specific SPS resource is scheduled, the method may further include: reporting, to the base station, the information for the transmission state of the one or more SPS configuration information, before a specific time when the transmission of the SPS message is performed.

In addition, preferably, when a transmission of control information or data information through another uplink channel is overlapped with the report, one of the transmission through different uplink channel or the report may be performed according to priority.

In addition, preferably, one or more SPS resources corresponding to the one or more SPS configuration information may be discontinuously located based on a time unit which is predefined therebetween.

According to another aspect of the present invention, a user equipment (UE) for receiving allocation of a radio resource in a wireless communication system includes a transceiver unit for transmitting and receiving a radio signal and a processor functionally connected with the transceiver unit, the processor is configured to: receive, from a base station, one or more Semi-Persistent Scheduling (SPS) configuration information including semi-persistent resource allocation information, receive, from the base station, SPS activation for specific SPS configuration information among the one or more SPS configuration information, receiving allocation of a specific SPS resource based on the specific SPS configuration information, and when a transmission of an SPS message using the specific SPS resource is terminated, report, to the base station, information for a transmission state of the one or more SPS configuration information, and the information for the transmission state of the one or more SPS configuration information includes activation indication information related to the one or more types of SPS configuration information or release indication information related to the one or more SPS configuration information.

Technical Effects

According to an embodiment of the present invention, in the case that a plurality of SPS configurations is activated, a User Equipment may be allocated of a resource for a single SPS configuration or a plurality of SPS configurations.

In addition, according to an embodiment of the present invention, even in the case that SPS transmission situation is changed during SPS data is transmitted (e.g., change according to User Equipment's mobility, change of SPS resource size, etc.), a User Equipment may perform SPS transmission adaptively.

In addition, according to an embodiment of the present invention, as SPS resource not used by a specific User Equipment is reported to a base station, another User Equipment receives allocation of the SPS resource, and uses it efficiently.

In addition, according to an embodiment of the present invention, in the case that a transmission of an event-triggered message is requested while a User Equipment performs an SPS transmission, the User Equipment may transmit the event-triggered message by using the existing or new SPS configuration information.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

BEST MODE FOR INVENTION

Figure 1:
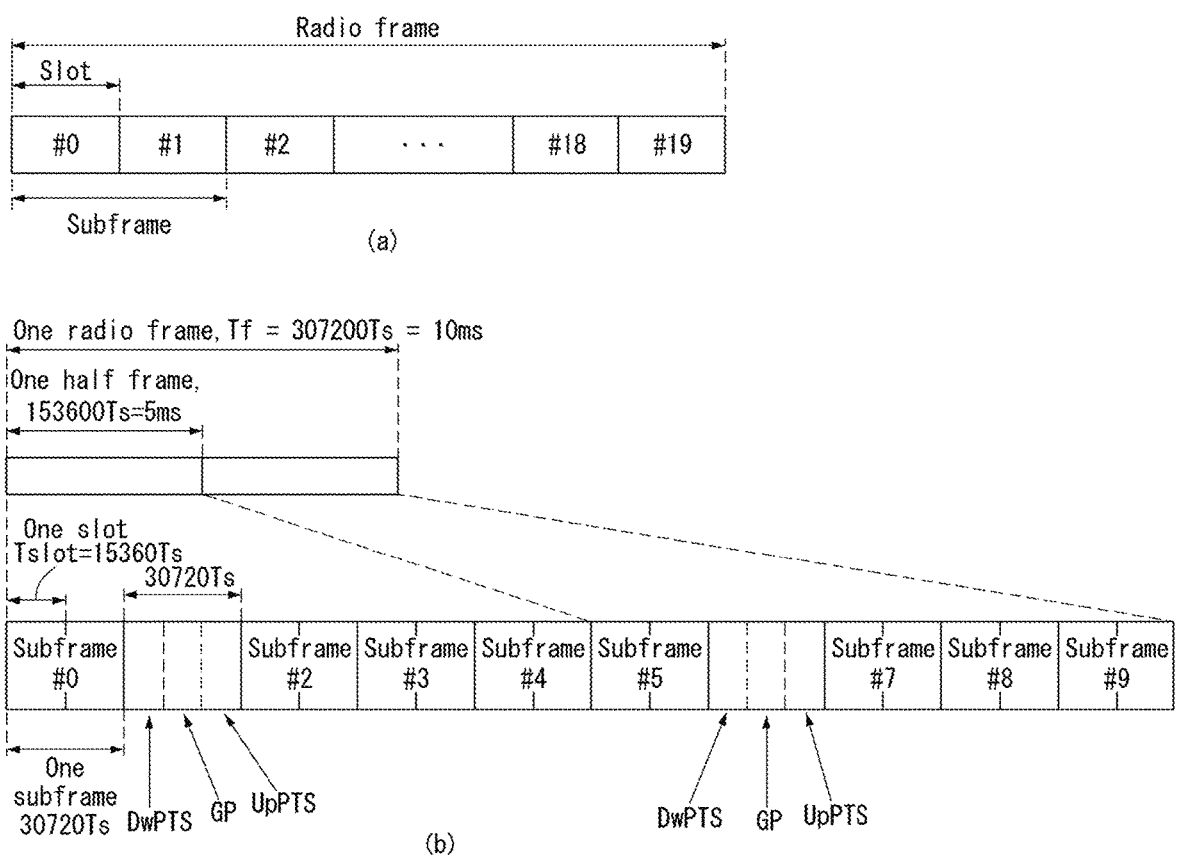
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| 0 | 5 ms | | | | | | | | | | |
| 1 | 5 ms | | | | | | | | | | |
| 2 | 5 ms | | | | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

The structure of the radio frame according to the example of FIG. 1 is only one example. The number of subcarriers included in one radio frame, the number of slots included in one subframe, and the number of OFDM symbols included in one slot may be changed in various manners.

Figure 2:
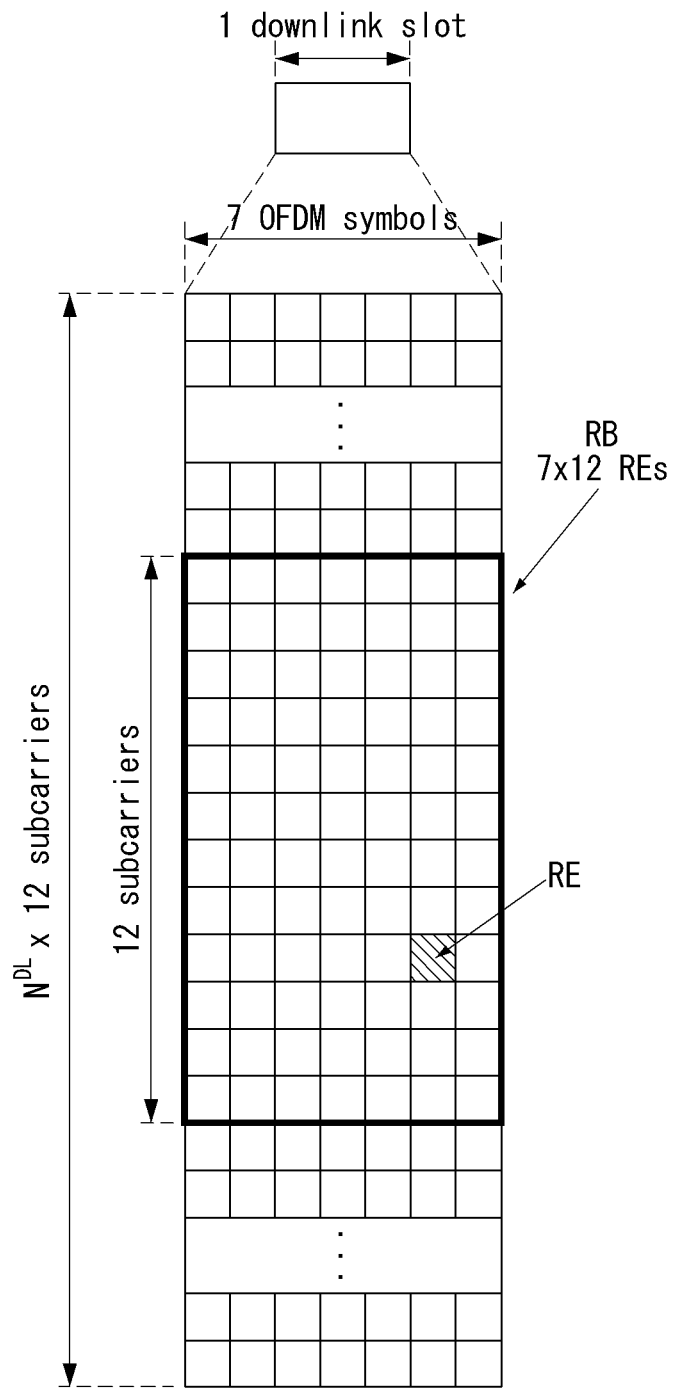
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
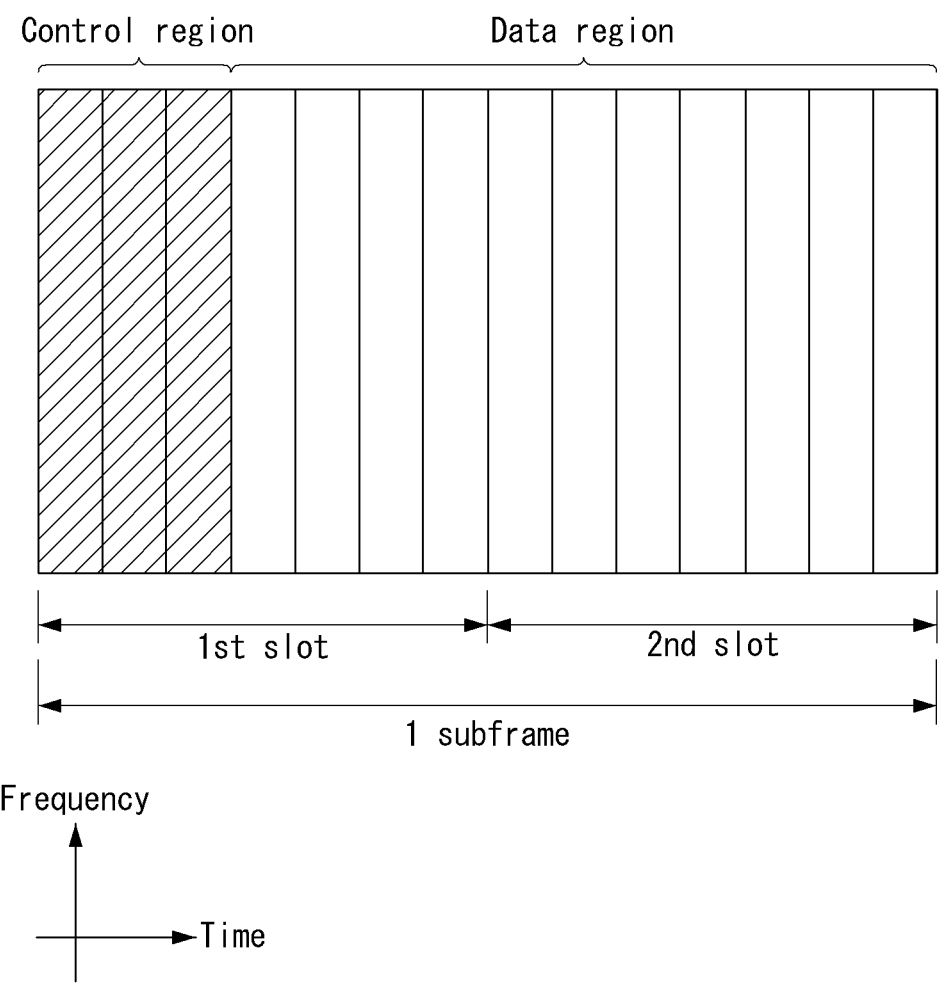
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

Figure 4:
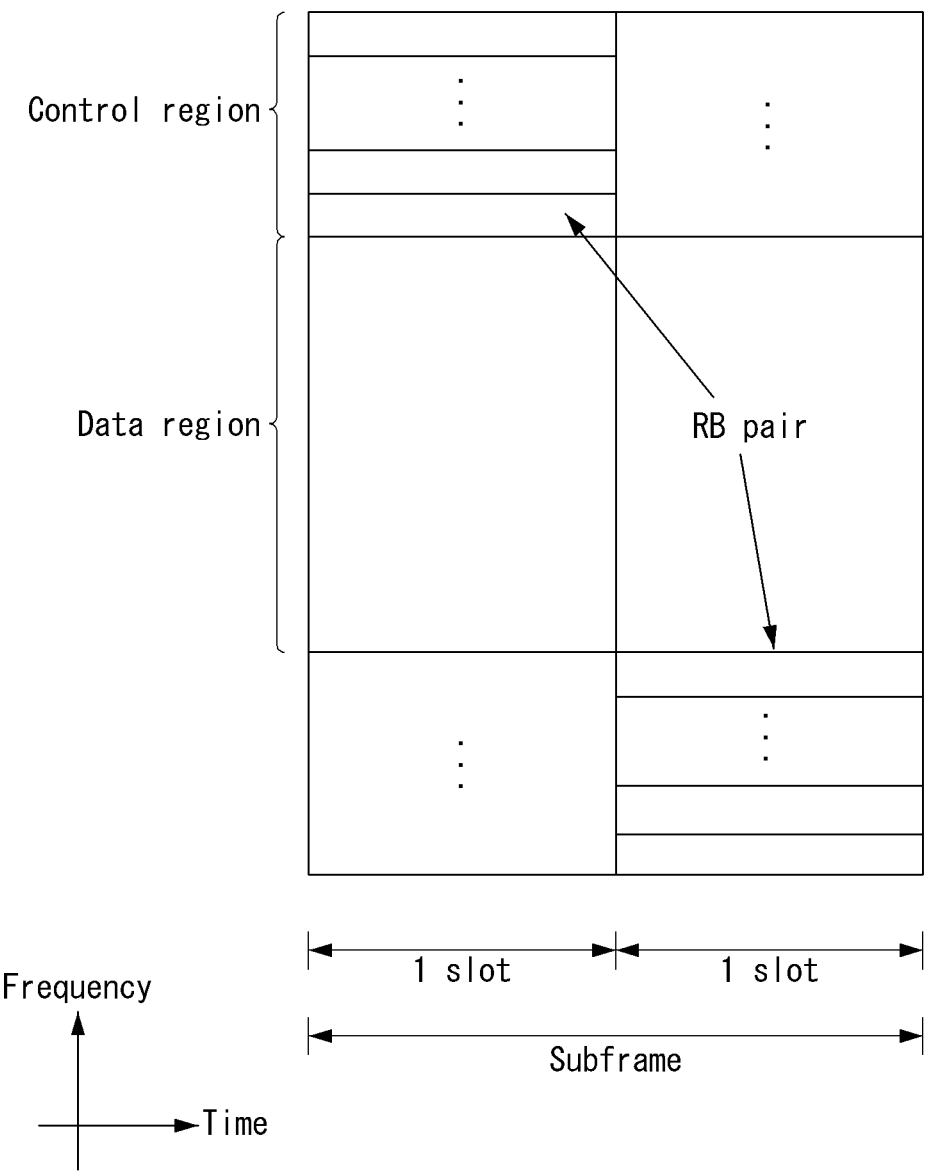
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a Precoding Matrix Indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 3 given below.

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
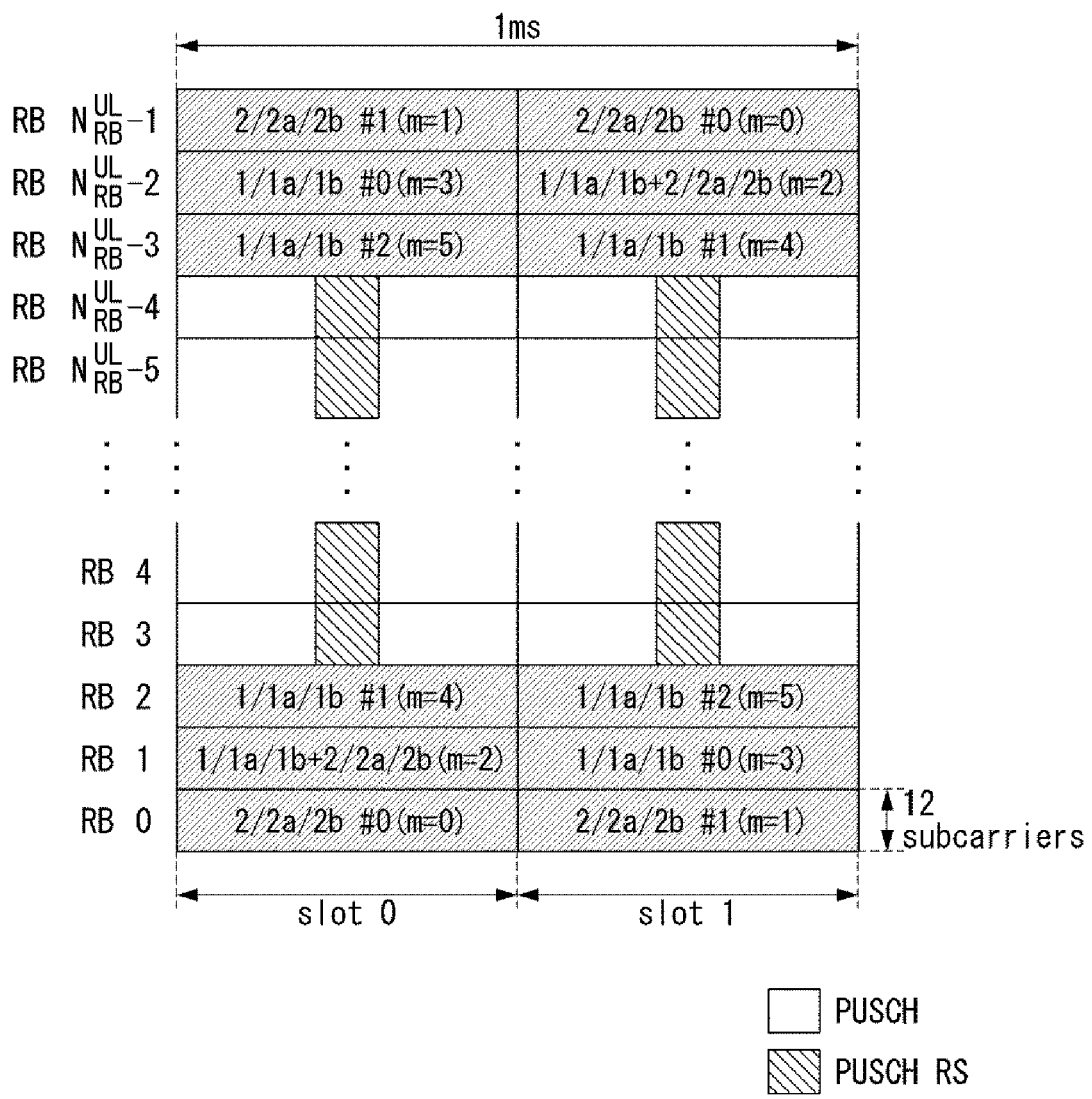
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number $(N_{RB}^{(2)})$ of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
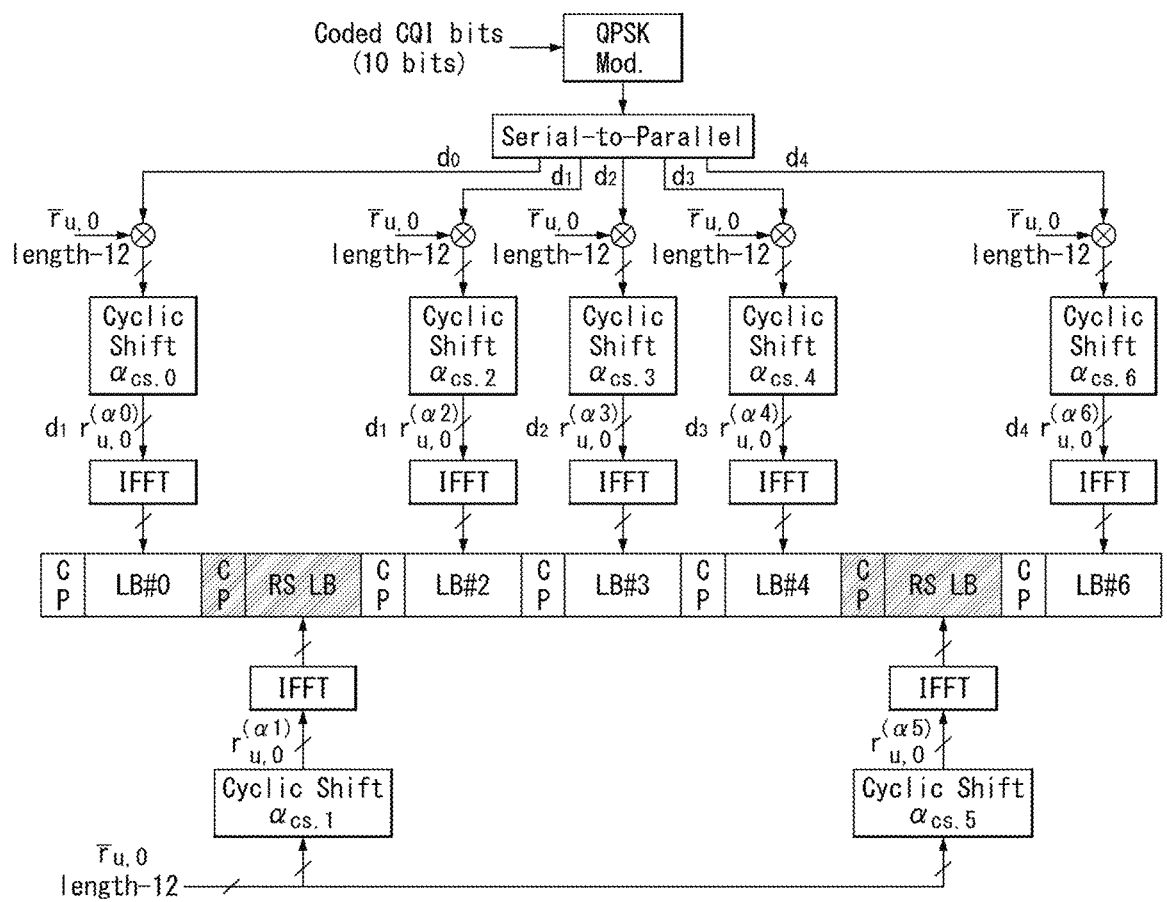
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1b will be described.

In the PUCCH format 1a/1b, a symbol modulated using a BPSK or QPSK modulation method is multiplied with a CAZAC sequence of a length 12. For example, a result in which a CAZAC sequence r (n) (n=0, 1, 2, . . . , N-1) of a length N is multiplied to a modulation symbol d(0) becomes y(0), y(1), y(2), . . . , y(N-1). y(0), y(1), y(2), . . . y(N-1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
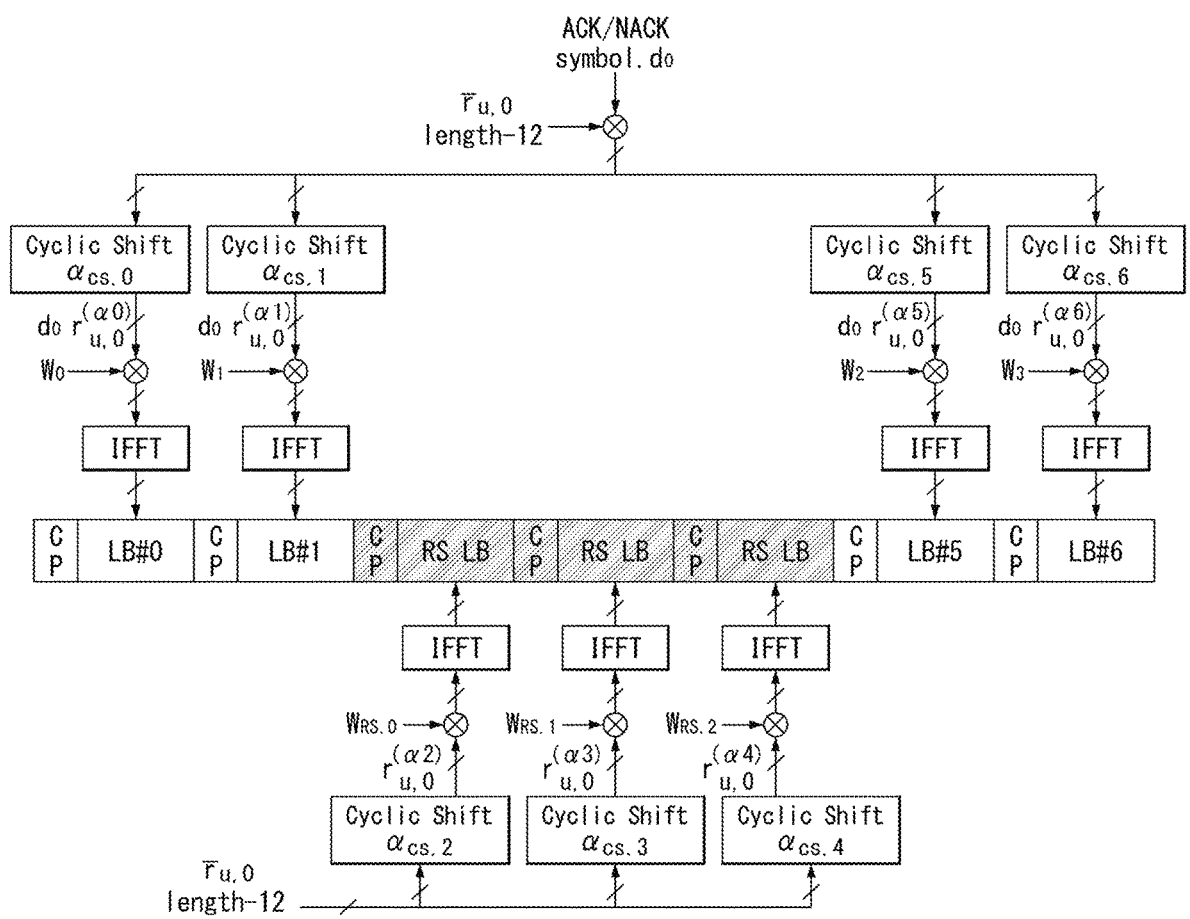
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spread scheme is described in detail later with reference to FIG. 14.

PUCCH Piggybacking

Figure 8:
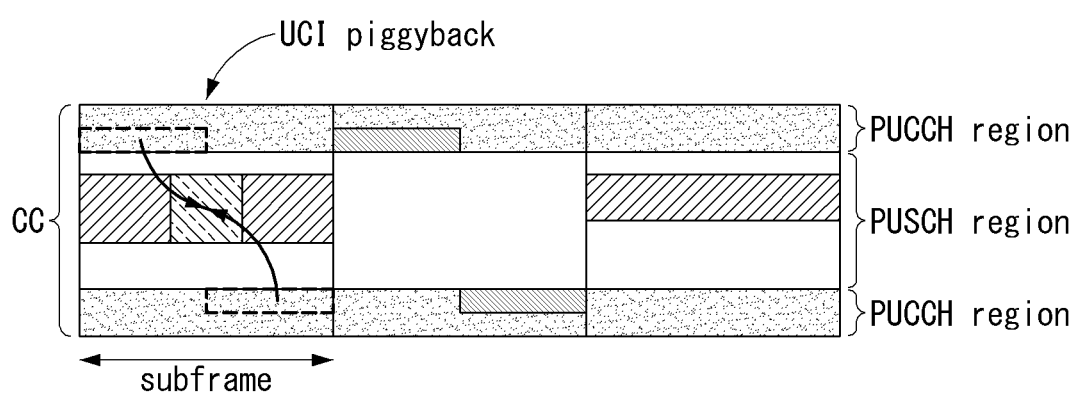
FIG. 8 illustrates an example of transmission channel processing of UL-SCH in a wireless communication system to which the present invention may be applied.

FIG. 8 illustrates one example of transport channel processing of a UL-SCH in the wireless communication system to which the present invention can be applied.

Figure 11:
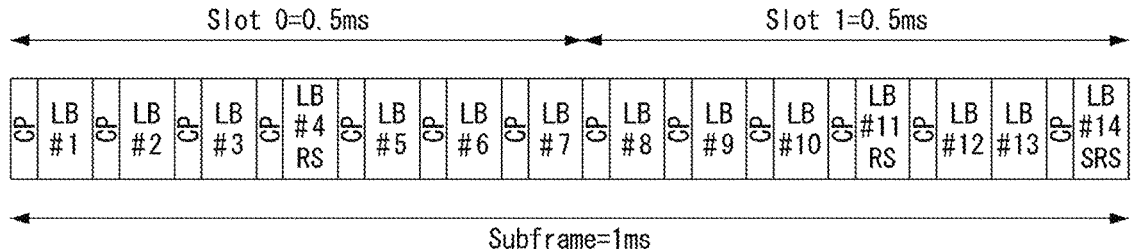
FIG. 11 illustrates an uplink subframe including a sounding reference signal symbol in a wireless communication system to which the present invention may be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 9:
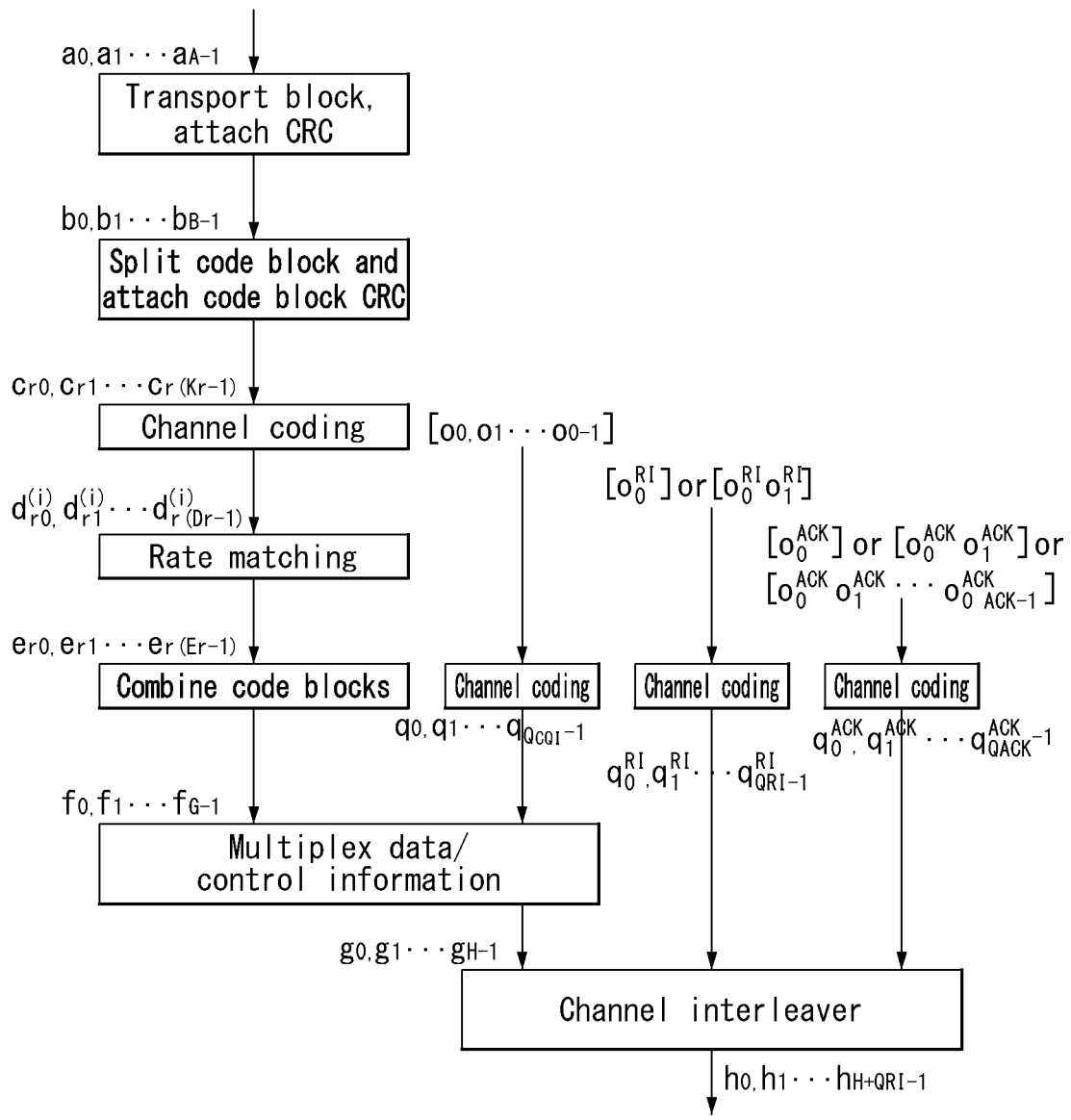
FIG. 9 illustrates an example of signal processing process of uplink shared channel which is a transport channel in a wireless communication system to which the present invention may be applied.

FIG. 9 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 9, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S90). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S91). Bits after the code block segmentation and the CRC attachment are shown in $c_{r0}, c_{r1}, c_{r2}, c_{r3}, \ldots, c_{r(K_r-1)}$. Herein, r represents No. (r=0, . . . , C−1) of the code block and Kr represents the bit number depending on the code block r. Further, C represents the total number of code blocks.

Subsequently, channel coding is performed (S92). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, . . . , C−1) and C represents the total number of code blocks. Each code block may be encoded by turbo coding.

Subsequently, rate matching is performed (S93). Bits after the rate matching are shown in $e_{r0}, e_{r1}, e_{r2}, e_{r3}, \ldots, e_{r(E_r-1)}$. In this case, r represents the code block number (r=0, . . . , C−1) and C represents the total number of code blocks. Er represents the number of rate-matched bits of the r-th code block.

Subsequently, concatenation among the code blocks is performed again (S94). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S96, S97, and S98). Since different encoded symbols are allocated for transmitting each piece of control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S94, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S95). A multiplexed result of the data and the CQI/PMI is shown in $g_0, g_1, g_2, g_3, \ldots, g_{H'-1}$. In this case, $g_i$ (i=0, ..., H'−1) represents a column vector having a length of $(Q_m \cdot N_L)$. $H = G + N_L \cdot Q_{CQI}$ and $H' = H/(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S99).

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable user equipment (UE) to acquire a channel information in downlink (DL), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when an eNB transmits DL data. If UE receives the corresponding reference signal, the UE can perform channel estimation, thereby demodulating data. And, the corresponding reference signal should be transmitted in a data transmitted region.

5 types of downlink reference signals are defined.

A cell-specific reference signal (CRS)

A multicast-broadcast single-frequency network reference signal (MBSFN RS)

A UE-specific reference signal or a demodulation reference signal (DM-RS)

A positioning reference signal (PRS)

A channel state information reference signal (CSI-RS)

One RS is transmitted in each downlink antenna port.

The CRS is transmitted in all of downlink subframe in a cell supporting PDSCH transmission. The CRS is transmitted in one or more of antenna ports 0-3. The CRS is transmitted only in $\Delta f=15$ kHz.

The MBSFN RS is transmitted in the MBSFN region of an MBSFN subframe only when a physical multicast channel (PMCH) is transmitted. The MBSFN RS is transmitted in an antenna port 4. The MBSFN RS is defined only in an extended CP.

The DM-RS is supported for the transmission of a PDSCH and is transmitted in antenna ports p=5, p=7, p=8 or p=7, 8, ..., υ+6. In this case, υ is the number of layers which is used for PDSCH transmission. The DM-RS is present and valid for the demodulation of a PDSCH only when PDSCH transmission is associated in a corresponding antenna port. The DM-RS is transmitted only in a resource block (RB) to which a corresponding PDSCH is mapped.

If any one of physical channels or physical signals other than the DM-RS is transmitted using the resource element (RE) of the same index pair (k,l) as that of a RE in which a DM-RS is transmitted regardless of an antenna port "p", the DM-RS is not transmitted in the RE of the corresponding index pair (k,l).

The PRS is transmitted only in a resource block within a downlink subframe configured for PRS transmission.

If both a common subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MBSFN region of the corresponding subframe use an extended CP.

The start point of an OFDM symbol configured for PRS transmission within a subframe configured for the PRS transmission is the same as the start point of a subframe in which all of OFDM symbols have the same CP length as an OFDM symbol configured for the PRS transmission.

The PRS is transmitted in an antenna port 6.

The PRS is not mapped to RE (k,l) allocated to a physical broadcast channel (PBCH), a PSS or and SSS regardless of an antenna port "p."

The PRS is defined only in $\Delta f=15$ kHz.

The CSI-RS is transmitted in 1, 2, 4 or 8 antenna ports using p=15, p=15, 16, p=15, ..., 18 and p=15, ..., 22, respectively.

The CSI-RS is defined only in $\Delta f=15$ kHz.

A reference signal is described in more detail.

The CRS is a reference signal for obtaining information about the state of a channel shared by all of UEs within a cell and measurement for handover, etc. The DM-RS is used to demodulate data for only specific UE. Information for demodulation and channel measurement may be provided using such reference signals. That is, the DM-RS is used for only data demodulation, and the CRS is used for the two purposes of channel information acquisition and data demodulation.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., an eNB). The CRS is also referred to as a cell-specific RS. On the contrary, a reference signal associated with a feed-back of channel state information (CSI) may be defined as CSI-RS.

The DM-RS may be transmitted through resource elements when data demodulation on the PDSCH is required. The terminal may receive whether the DM-RS is present through the upper layer and is valid only when the corresponding PDSCH is mapped. The DM-RS may be referred to as the UE-specific RS or the demodulation RS (DMRS).

Figure 10:
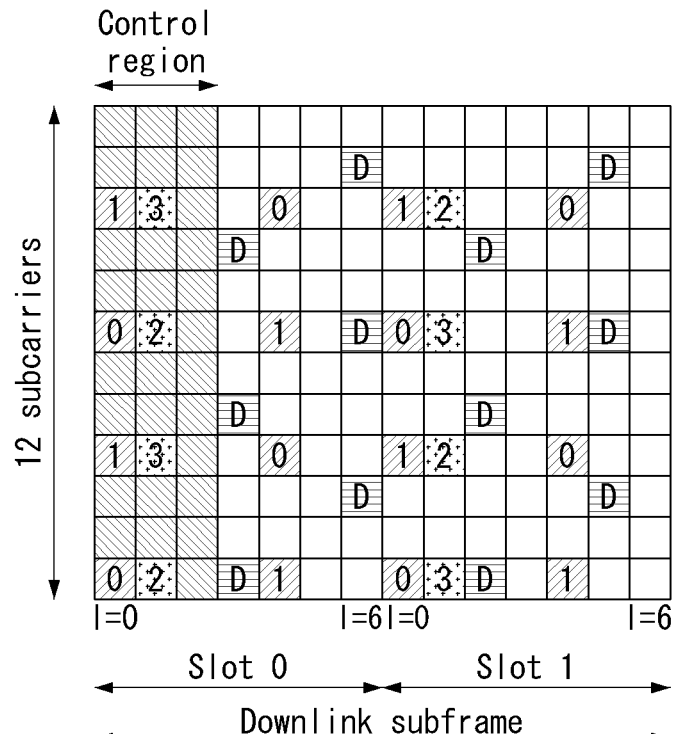
FIG. 10 illustrates a reference signal pattern mapped to a downlink resource block pair in a wireless communication system to which the present invention may be applied.
Figure 10:
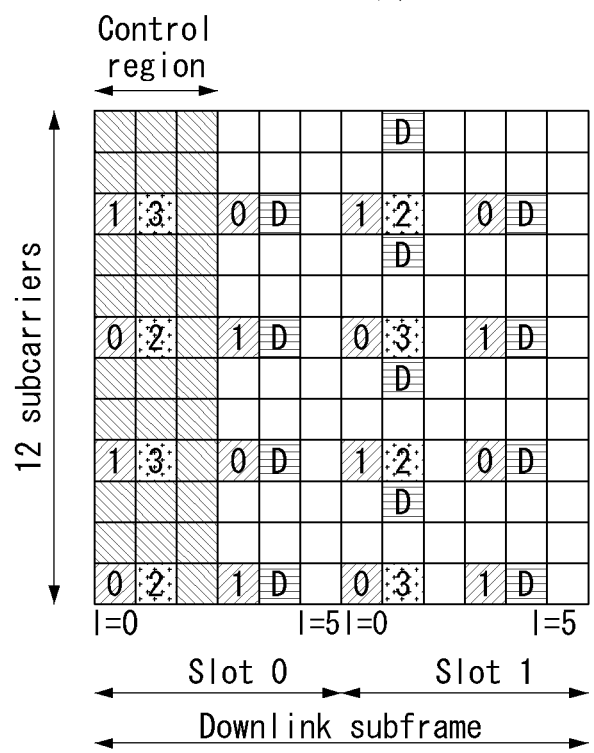

FIG. 10 illustrates a reference signal pattern mapped to a downlink resource block pair in the wireless communication system to which an embodiment of the present invention may be applied.

Referring to FIG. 10, as a unit in which the reference signal is mapped, the downlink resource block pair may be expressed by one subframe in the time domain x 12 subcarriers in the frequency domain.

That is, one resource block pair has a length of 14 OFDM symbols in the case of a normal cyclic prefix (CP) (FIG. 10(a)) and a length of 12 OFDM symbols in the case of an extended cyclic prefix (CP) (FIG. 10(b)). Resource elements (REs) represented as '0', '1', '2', and '3' in a resource block lattice mean the positions of the CRSs of antenna port indexes '0', '1', '2', and '3', respectively and resource elements represented as 'D' means the position of the DM-RS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \qquad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 represents the case of the normal CP and Equation 3 represents the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 1 to 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 11 illustrates an uplink subframe including a sounding reference signal symbol in the wireless communication system to which the present invention can be applied.

Referring to FIG. 11, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished from each other by allocating different base sequences to respective cells, but orthogonality between different base sequences is not secured.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used interchangeably with the term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 12:
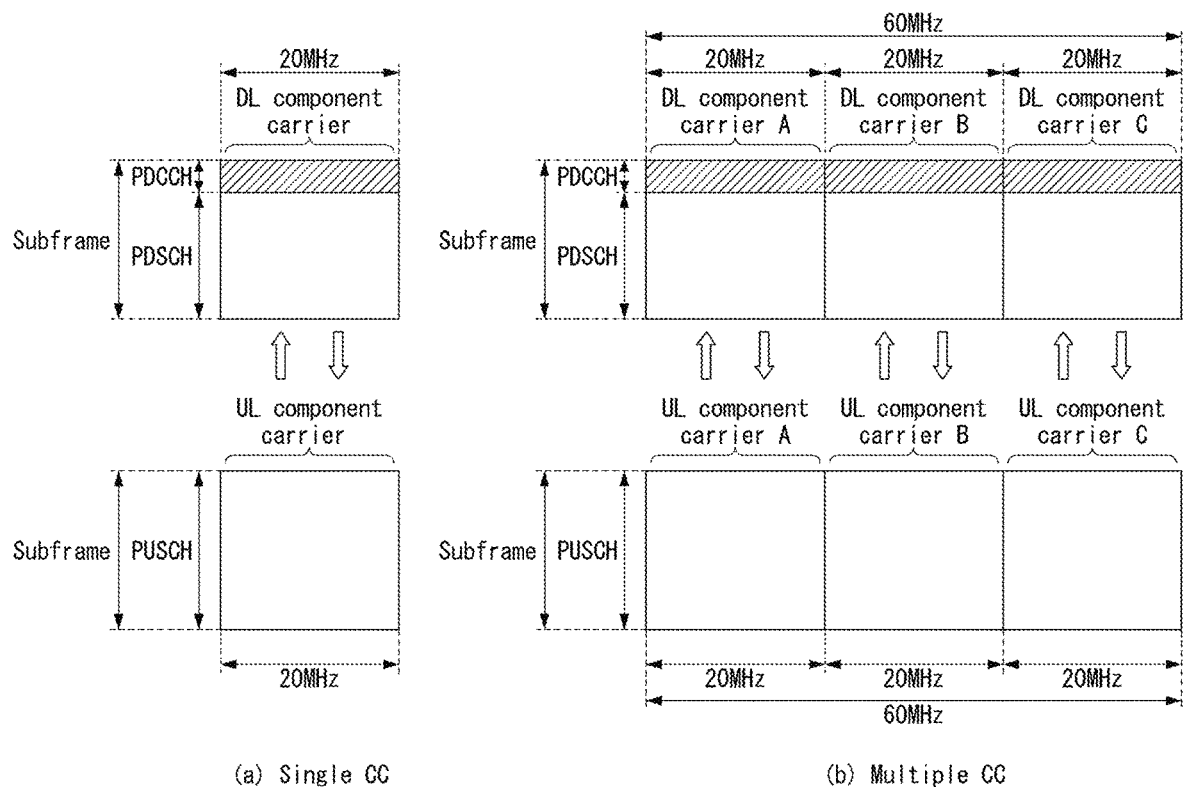
FIG. 12 illustrates an example of component carrier and carrier aggregation in a wireless communication system to which the present invention may be applied.

FIG. 12 illustrates examples of a component carrier and carrier aggregation in the wireless communication system to which the present invention can be applied.

FIG. 12(a) illustrates a single carrier structure used in an LTE system. The component carrier includes the DL CC and the UL CC. One component carrier may have a frequency range of 20 MHz.

FIG. 12(b) illustrates a carrier aggregation structure used in the LTE system. In the case of FIG. 12(b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 13:
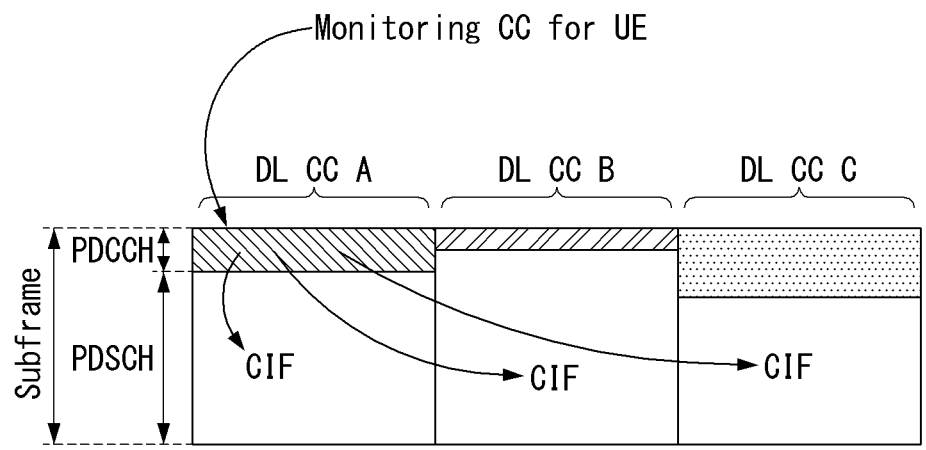
FIG. 13 illustrates an example of subframe structure according to cross carrier scheduling in a wireless communication system to which the present invention may be applied.

FIG. 13 illustrates one example of a subframe structure depending on cross carrier scheduling in the wireless communication system to which the present invention can be applied.

Referring to FIG. 13, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

PDCCH Transmission

An eNB determines a PDCCH format depending on a DCI to be transmitted to a UE and attaches cyclic redundancy check (CRC) to control information. The CRC is masked with a unique identifier (this is called a radio network temporary identifier (RNTI)) depending on the owner or use of the PDCCH. If the PDCCH is a PDCCH a specific UE, the CRC may be masked with a unique identifier of the UE, for example, a cell-RNTI (C-RNTI). Or if the PDCCH is a PDCCH for a paging message, the CRC may be masked with a paging indication identifier, for example, a paging-RNTI (P-RNTI). If the PDCCH is a PDCCH for system information, more specifically, a system information block (SIB), the CRC may be masked with a system information identifier, a system information RNTI (SI-RNTI). In order to indicate a random access response, that is, a response to the transmission of the random access preamble of the UE, the CRC may be masked with a random access-RNTI (RA-RNTI).

Next, the eNB generates coded data by performing channel coding on the control information to which the CRC has been added. In this case, the eNB may perform the channel coding at a code rate according to an MCS level. The eNB performs rate matching according to a CCE aggregation level allocated to a PDCCH format, and generates modulation symbols by modulating the coded data. In this case, a modulation rank according to the MCS level may be used. In modulation symbols forming one PDCCH, a CCE aggregation level may be one of 1, 2, 4 and 8. Thereafter, the eNB maps the modulation symbols to a physical resource element (CCE to RE mapping).

A plurality of PDCCHs may be transmitted within one subframe. That is, the control region of one subframe consists of a plurality of CCEs having indices $0 \sim N_{CCE,k}-1$. In this case, $N_{CCE,k}$ means a total number of CCEs within the control region of a k-th subframe. The UE monitors a plurality of PDCCHs every subframe.

In this case, the monitoring means that the UE attempts the decoding of each PDCCH depending on a PDCCH format that is monitored. In the control region allocated within a subframe, the eNB does not provide the UE with information regarding that where is a corresponding PDCCH. In order to receive a control channel transmitted by the eNB, the UE is unaware that its own PDCCH is transmitted at which CCE aggregation level or DCI format at which location. Accordingly, the UE searches the subframe for its own PDCCH by monitoring a set of PDCCH candidates. This is called blind decoding/detection (BD). Blind decoding refers to a method for a UE to de-mask its own UE identifier (UE ID) from a CRC part and to check whether a corresponding PDCCH is its own control channel by reviewing a CRC error.

In the active mode, the UE monitors a PDCCH every subframe in order to receive data transmitted thereto. In the DRX mode, the UE wakes up in the monitoring interval of a DRX period and monitors a PDCCH in a subframe corresponding to the monitoring interval. A subframe in which the monitoring of the PDCCH is performed is called a non-DRX subframe.

In order to receive a PDCCH transmitted to the UE, the UE needs to perform blind decoding on all of CCEs present in the control region of a non-DRX subframe. The UE is unaware that which PDCCH format will be transmitted, and thus has to decode all of PDCCHs at a CCE aggregation level until the blind decoding of the PDCCHs is successful within the non-DRX subframe. The UE needs to attempt detection at all of CCE aggregation levels until the blind decoding of a PDCCH is successful because it is unaware that the PDCCH for the UE will use how many CCEs. That is, the UE performs blind decoding for each CCE aggregation level. That is, the UE first attempts decoding by setting a CCE aggregation level unit to 1. If decoding fully fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts blind decoding on all of a C-RNTI, P-RNTI, SI-RNTI and RA-RNTI. Furthermore, the UE attempts blind decoding on all of DCI formats that need to be monitored.

As described above, if the UE performs blind decoding on all of possible RNTIs, all of DCI formats to be monitored and for each of all of CCE aggregation levels, the number of detection attempts is excessively many. Accordingly, in the LTE system, a search space (SS) concept is defined for the blind decoding of a UE. The search space means a PDCCH candidate set for monitoring, and may have a different size depending on each PDCCH format.

The search space may include a common search space (CSS) and a UE-specific/dedicated search space (USS). In the case of the common search space, all of UEs may be aware of the size of the common search space, but a UE-specific search space may be individually configured for each UE. Accordingly, in order to decode a PDCCH, a UE must monitor both the UE-specific search space and the common search space, and thus performs a maximum of 44 times of blind decoding (BD) in one subframe. This does not include blind decoding performed based on a different CRC value (e.g., C-RNTI, P-RNTI, SI-RNTI, RA-RNTI).

There may occur a case where an eNB cannot secure CCE resources for transmitting a PDCCH to all of UEs to which the PDCCH is to be transmitted within a given subframe due to a smaller search space. The reason for this is that resources left over after a CCE location is allocated may not be included in the search space of a specific UE. In order to minimize such a barrier that may continue even in a next subframe, a UE-specific hopping sequence may be applied to the point at which the UE-specific search space starts.

Table 4 represents the size of the common search space and the UE-specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for the DCI formats 0 and 1A in the UE-specific search space. In this case, the DCI formats 0 and 1A have the same size, but the UE may distinguish between the DCI formats using a flag for the DCI format 0/format 1A differentiation included in a PDCCH. Furthermore, a different DCI format in addition to the DCI formats 0 and 1A may be required for the UE depending on a PDSCH transmission mode configured by an eNB. For example, the DCI formats 1, 1B and 2 may be required for the UE.

The UE may search the common search space for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier other than a UE-specific identifier.

A search space $S_k^{(L)}$ means a PDCCH candidate set according to an aggregation level $L \in \{1,2,4,8\}$ A CCE according to the PDCCH candidate set m of the search space may be determined by Equation 4.

$$L \cdot \{(Y_k+m) \bmod \lfloor N_{CCE,k}/L \rfloor\} + i \qquad \text{[Equation 4]}$$

In this case, $M^{(L)}$ indicates the number of PDCCH candidates according to a CCE aggregation level L for monitoring in the search space, and m=0, . . . , $M^{(L)}$−1. i is an index for designating an individual CCE in each PDCCH candidate, and is i=0, . . . , L−1.

As described above, in order to decode a PDCCH, the UE monitors both the UE-specific search space and the common search space. In this case, the common search space (CSS) supports PDCCHs having an aggregation level of {4, 8}, and the UE-specific search space (USS) supports PDCCHs having an aggregation level of {1, 2, 4, 8}.

Table 5 represents DCCH candidates monitored by a UE.

TABLE 5

| | Search space $S_k^{(L)}$ | | |
|---|---|---|---|
| Type | Aggregation level L | Size [in CCEs] | Number of PDCCH candidates $M^{(L)}$ |
| UE-specfic | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of the common search space, $Y_k$ is set to 0 with respect to two aggregation levels L=4 and L=8. In contrast, with respect to an aggregation level L, in the case of the UE-specific search space, $Y_k$ is defined as in Equation 5.

$$Y_k = (A \cdot Y_{k-1}) \bmod D \quad \text{[Equation 5]}$$

In this case, $Y_{-1} = n_{RNTI} \neq 0$, and an RNTI value used for $n_{RNTI}$ may be defined as one of the identifications of the UE. Furthermore, A=39827 D=65537, and k=$\lfloor n_s/2 \rfloor$. In this case, indicates the slot number (or index) of a radio frame.

ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |

TABLE 6-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 6 given above, discontinuous transmission (DTX) means that there is no data unit to be transmitted for the corresponding HARQ-ACK(i) or that the terminal may not detect the data unit corresponding to the HARQ-ACK(i).

According to Table 6 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails in decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Block Spread Scheme

Unlike the existing PUCCH format 1 series or 2 series, a block spread scheme is a method for modulating control signal transmission using an SC-FDMA method. As shown in FIG. 14, a symbol sequence may be spread on the time domain using orthogonal cover code (OCC) and transmitted. The control signals of a plurality of UEs may be multiplexed on the same RB using the OCC. In the case of the PUCCH format 2, one symbol sequence is transmitted over the time domain, and the control signals of a plurality of UEs are multiplexed using a cyclic shift (CS) of a CAZAC sequence.

In contrast, in the case of the block spread-based PUCCH format (e.g., PUCCH format 3), one symbol sequence is transmitted over the frequency domain, and the control signals of a plurality of UEs are multiplexed using the time domain spread using the OCC.

Figure 14:
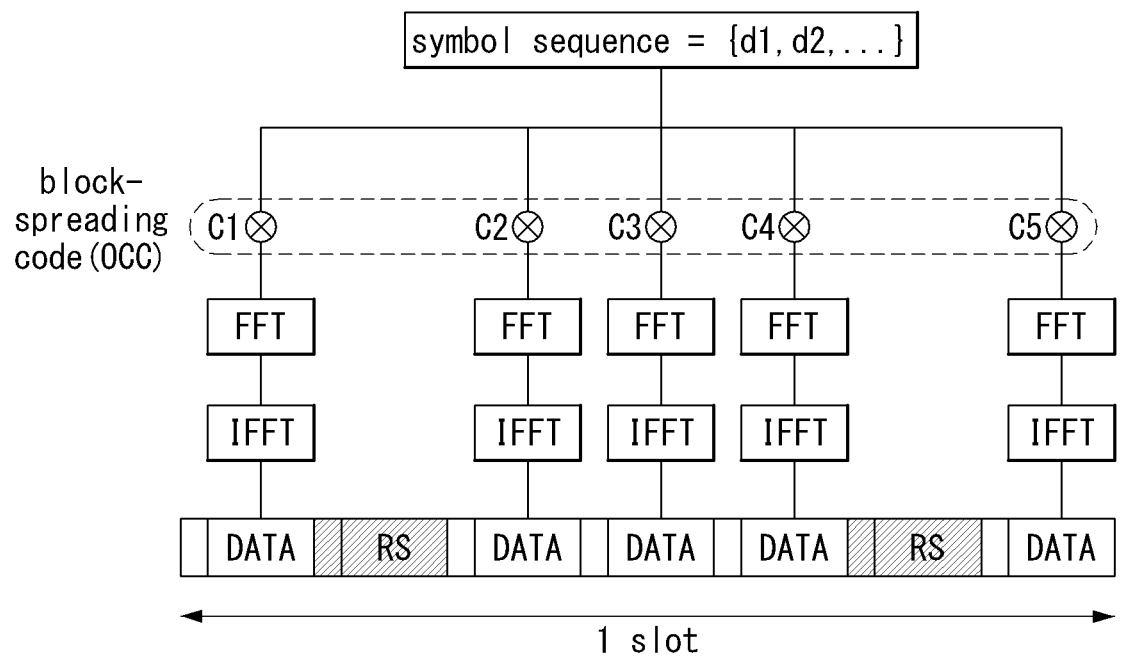
FIG. 14 illustrates an example of generating and transmitting five SC-FDMA symbols during a slot in a wireless communication system to which the present invention may be applied.

FIG. 14 illustrates one example of generating and transmitting 5 SC-FDMA symbols during one slot in the wireless communication system to which the present invention can be applied.

In FIG. 14, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 14, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

Hybrid—Automatic Repeat and Request (HARQ)

In a mobile communication system, one eNB transmits/receives data to/from a plurality of UEs through a radio channel environment in one cell/sector.

In a system operating using multiple carriers and a similar form, an eNB receives packet traffic from the wired Internet and transmits the received packet traffic to each UE using a predetermined communication method. In this case, what the eNB determines to transmit data to which UE using which frequency domain at which timing is downlink scheduling.

Furthermore, the eNB receives and demodulates data transmitted by UEs using a communication method of a predetermined form, and transmits packet traffic to the wired Internet. What an eNB determines to transmit uplink data to which UEs using which frequency band at which timing is uplink scheduling. In general, a UE having a better channel state transmits/receives data using more time and more frequency resources.

Figure 15:
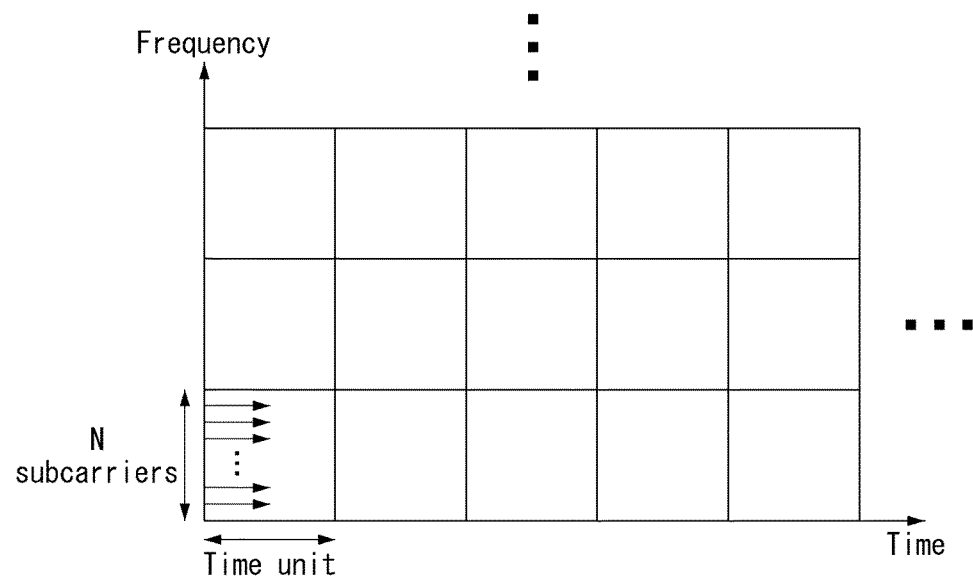
FIG. 15 is a diagram illustrating a time-frequency resource block in the time frequency domain of a wireless communication system to which the present invention may be applied.

FIG. 15 is a diagram illustrating a time-frequency resource block in the time frequency domain of a wireless communication system to which the present invention may be applied.

Resources in a system using multiple carriers and a similar form may be basically divided into time and frequency domains. The resources may be defined as a resource block. The resource block includes specific N subcarriers and specific M subframes or a predetermined time unit. In this case, N and M may be 1.

In FIG. 15, one rectangle means one resource block, and one resource block includes several subcarriers in one axis and a predetermined time unit in the other axis. In the downlink, an eNB schedules one or more resource block for a selected UE according to a predetermined scheduling rule, and the eNB transmits data to the UE using the allocated resource blocks. In the uplink, the eNB schedules one or more resource block for a selected UE according to a predetermined scheduling rule, and UEs transmits data using the allocated resources in the uplink.

After data is transmitted after scheduling, an error control method if a frame is lost or damaged includes an automatic repeat request (ARQ) method and a hybrid ARQ (HARQ) method of a more advanced form.

Basically, in the ARQ method, after one frame transmission, the reception side waits for an acknowledgement message (ACK). The reception side transmits an acknowledgement message (ACK) only when a message is properly received. If an error is generated in a frame, the reception side transmits a negative-ACK (NACK) message and deletes information about the erroneously received frame from a reception stage buffer. A transmission side transmits a subsequent frame when it receives an ACK signal is received, but retransmits the frame when it receives a NACK message.

Unlike in the ARQ method, in the HARQ method, if a received frame cannot be demodulated, the reception stage transmits a NACK message to the transmission stage, but stores the received frame in the buffer for a specific time, and combines the stored frame with a previously received frame when the frame is retransmitted, thereby increasing a reception success rate.

Recently, a more efficient HARQ method than the basic ARQ method is widely used. In addition to the HARQ method, several types are present. The HARQ method may be divided into synchronous HARQ and asynchronous HARQ depending on timing for retransmission. With respect to the amount of resources used upon retransmission, the method may be divided into a channel-adaptive method and a channel-non-adaptive method depending on whether a channel state is incorporated or not.

The synchronous HARQ method is a method in which subsequent retransmission is performed by a system at predetermined timing when initial transmission fails. That is, assuming that timing at which retransmission is performed every fourth time unit after the initial transmission fails, since an agreement has been previously made between an eNB and UEs, it is not necessary to additionally provide notification of the timing. However, if the data transmission side has received a NACK message, a frame is retransmitted every fourth time unit until an ACK message is received.

In contrast, in the asynchronous HARQ method, retransmission timing may be newly scheduled or may be performed through additional signaling. Timing at which retransmission for a previously failed frame varies due to several factors, such as a channel state.

The channel-non-adaptive HARQ method is a method in which upon retransmission, the modulation of a frame or the number of resource blocks used or adaptive modulation and coding (ACM) is performed as predetermined upon initial transmission. Unlike in the channel-non-adaptive HARQ method, the channel-adaptive HARQ method is a method in which they vary depending on the state of a channel. For example, in the channel-non-adaptive HARQ method, a transmission side transmitted data using six resource blocks upon initial transmission and retransmits data using six resource blocks likewise even upon retransmission. In contrast, although transmission has been performed using 6 resource blocks at the early stage, a method of performing retransmission using resource blocks greater than or smaller than 6 depending on a channel state is a channel-adaptive HARQ method.

Four combinations of HARQ may be performed based on such classification, but a chiefly used HARQ method includes an asynchronous channel-adaptive asynchronous, a channel-adaptive HARQ (HARQ) method, and a synchronous and channel-non-adaptive HARQ method.

The asynchronous channel-adaptive HARQ method can maximize retransmission efficiency because retransmission timing and the amount of resources used are adaptively made different depending on the state of a channel, but is not generally taken into consideration because it has a disadvantage in that it has increasing overhead.

Meanwhile, the synchronous channel-non-adaptive HARQ method has an advantage in that there is almost no overhead because timing and resource allocation for retransmission have been agreed within a system, but has a disadvantage in that retransmission efficiency is very low if it is used in a channel state in which a change is severe.

Figure 16:
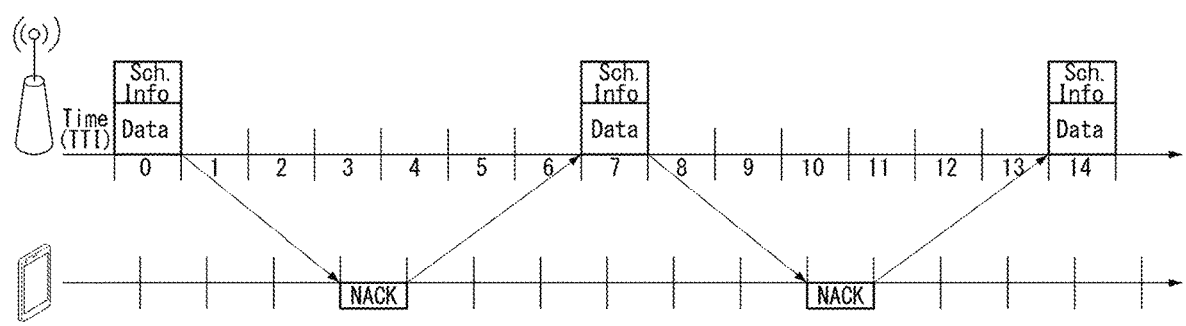
FIG. 16 is a diagram illustrating a resources allocation and retransmission process of an asynchronous HARQ method in a wireless communication system to which the present invention may be applied.

FIG. 16 is a diagram illustrating a resources allocation and retransmission process of an asynchronous HARQ method in a wireless communication system to which the present invention may be applied.

Meanwhile, for example, in the case of the downlink, after data is transmitted after scheduling, ACK/NACK information is received from a UE, and time delay is generated after next data is transmitted as in FIG. 16. The delay is delay generated due to channel propagation delay and the time taken for data decoding and data encoding.

For non-empty data transmission during such a delay interval, a transmission method using an independent HARQ process is used. For example, if the shortest period between next data transmission and next data transmission is 7 subframes, data transmission can be performed without an empty space if 7 independent processes are placed.

An LTE physical layer supports HARQ in a PDSCH and PUSCH and transmits associated reception ACK feedback in a separate control channel.

If the LTE FDD system does not operate in MIMO, 8 stop-and-wait (SAW) HARQ processes are supported both in the uplink and downlink as a constant round-trip time (RTT) of 8 ms.

CA-Based CoMP Operation

In the LTE-post system, cooperative multi-point (CoMP) transmission may be implemented using a carrier aggregation (CA) function in LTE.

Figure 17:
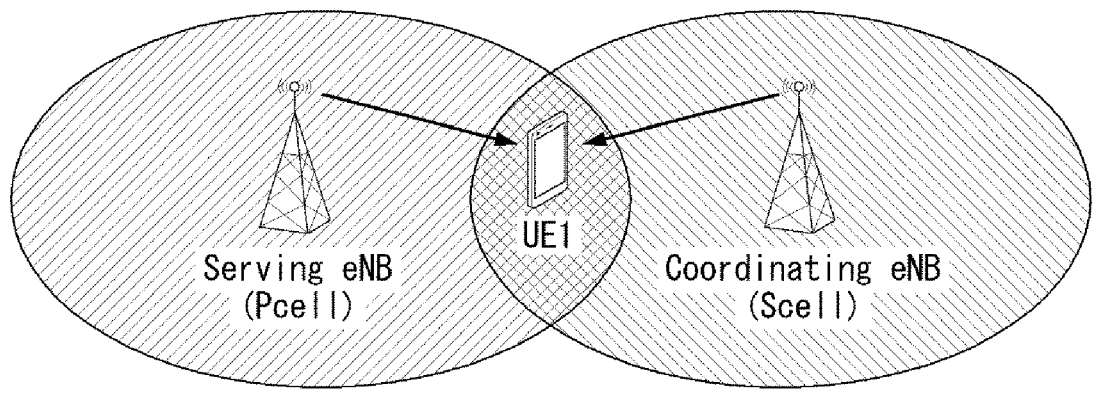
FIG. 17 is a diagram illustrating a carrier aggregation-based CoMP system in a wireless communication system to which the present invention may be applied.
Figure 17:
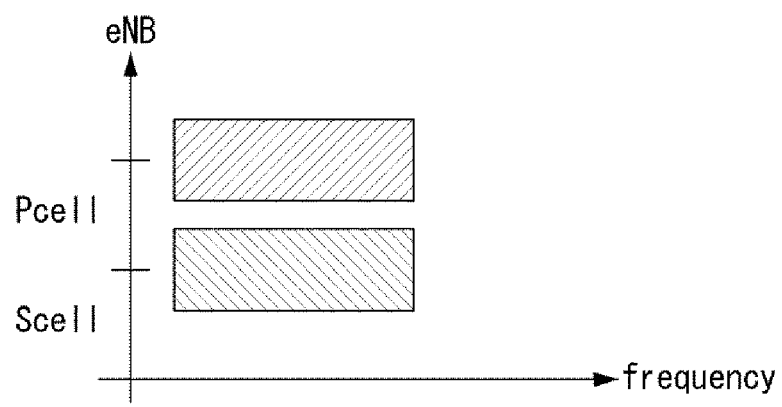

FIG. 17 is a diagram illustrating a carrier aggregation-based CoMP system in a wireless communication system to which the present invention may be applied.

FIG. 17 illustrates a case where a primary cell (PCell) carrier and a secondary cell (SCell) carrier are allocated to two eNBs that use the same frequency band in a frequency axis and are geographically spaced apart, respectively.

Various DL/UL CoMP operations, such as JT, CS/CB, and dynamic cell selection, may be possible in such a manner that a serving eNB assigns the PCell to a UE1 and assign an SCell, to an adjacent eNB having great interference.

FIG. 17 illustrates an example in which a UE merges the two eNBs as a PCell and an SCell, respectively. However, one UE may merge 3 or more cells. Some of the cells may perform a CoMP operation in the same frequency band and other cells may perform a simple CA operation in another frequency band. In this case, the PCell does not need to necessarily participate in the CoMP operation.

UE Procedure for PDSCH Reception

When a UE detects the PDCCH of a serving cell in which a DCI format 1, 1A, 1B, 1C, 1D, 2, 2A, 2B or 2C intended therefor is delivered within a subframe other than a subframe(s) indicated by a high layer parameter "mbsfn-SubframeConfigList", it decodes a corresponding PDSCH in the same subframe due to a limit of the number of transport blocks defined in a high layer.

It is assumed that the UE decodes a PDSCH according to the detected PDCCH carrying the DCI format 1A or 1C intended therefor and having CRC scrambled by an SI-RNTI or P-RNTI and a PRS is not present in a resource block (RB) in which the corresponding PDSCH is delivered.

It is assumed that in the UE in which a carrier indication field (CIF) for a serving cell is configured, a carrier indication field is not present in any PDCCH of the serving cell within a common search space.

If not, it is assumed that when PDCCH CRC is scrambled by the C-RNTI or SPS C-RNTI, in a UE in which a CIF is configured, a CIF for the serving cell is present in a PDCCH located within a UE-specific search space.

When the UE is configured by a high layer so that it decodes a PDCCH having CRC scrambled by an SI-RNTI, the UE decodes the PDCCH and the corresponding PDSCH according to a combination defined in Table 7. The PDSCH corresponding to the PDCCH(s) is subjected to scrambling initialization by the SI-RNTI.

Table 7 illustrates the PDCCH and PDSCH configured by the SI-RNTI.

TABLE 7

| DCI format | Search space | PDSCH transmission method corresponding to a PDCCH |
| --- | --- | --- |
| DCI format 1C | Common | If the number of PBCH antenna ports is 1, a single antenna port, a port 0 is used, and if not, transmit diversity |
| DCI format 1A | Common | If the number of PBCH antenna ports is 1, a single antenna port, a port 0 is used, and if not, transmit diversity |

If the UE is configured by a high layer so that it decodes a PDCCH having CRC scrambled by a P-RNTI, the UE decodes the PDCCH and a corresponding PDSCH according to a combination defined in Table 8. The PDSCH corresponding to the PDCCH(s) is subjected to scrambling initialization by the P-RNTI.

Table 8 illustrates the PDCCH and PDSCH configured by the P-RNTI.

TABLE 8

| DCI format | Search space | PDSCH transmission method corresponding to a PDCCH |
| --- | --- | --- |
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity | scrambled by an RA-RNTI, the UE decodes the PDCCH and a corresponding PDSCH according to a combination defined in Table 9. The PDSCH corresponding to the PDCCH(s) is subjected to scrambling initialization by the RA-RNTI.

Table 9 illustrates the PDCCH and PDSCH scrambled by the RA-RNTI.

TABLE 9

| DCI format | Search space | PDSCH transmission method corresponding to PDCCH |
| --- | --- | --- |
| DCI format 1C | Common | If the number of PBCH antenna ports is 1, a single antenna port, port 0 is used, and if not, transmit diversity |
| DCI format 1A | Common | If the number of PBCH antenna ports is 1, a single antenna port, port 0 is used, and if not, transmit diversity |

The UE may be semi-statically configured through higher layer signaling so that it receives PDSCH data transmission signaled through a PDCCH according to one of nine transmission modes, such as a mode 1 to a mode 9.

In the case of a frame architecture type 1,
  A UE does not receive a PDSCH RB transmitted in the antenna port 5 within any subframe in which the number of OFDM symbols for a PDCCH having a normal CP is 4.
  If any one of 2 physical resource blocks (PRBs) to which a virtual resource block (VRB) pair is mapped overlaps a frequency in which a PBCH or a primary or secondary synchronization signal is transmitted within the same subframe, a UE does not receive a PDSCH RB transmitted in the antenna port 5, 7, 8, 9, 10, 11, 12, 13 or 14 in the corresponding 2 PRBs.
  A UE does not receive a PDSCH RB transmitted in the antenna port 7 to which distributed VRB resource allocation has been assigned.

If a UE does not receive all of allocated PDSCH RBs, it may skip the decoding of a transport block. If the UE skip decoding, a physical layer indicates a high layer that a transport block has not been successfully.

In the case of a frame architecture type 2,

A UE does not receive a PDSCH RB transmitted in the antenna port 5 within any subframe in which the number of OFDM symbols for a PDCCH having a normal CP is 4.

If any one of two PRBs to which a VRB pair is mapped overlaps a frequency in which a PBCH is transmitted within the same subframe, a UE does not receive a PDSCH RB in the antenna port 5 transmitted in the corresponding two PRBs.

If any one of two PRBs to which a VRB pair is mapped overlaps a frequency in which a primary or secondary synchronization signal is transmitted in the same subframe, a UE does not receive a PDSCH RB transmitted in the antenna port 7, 8, 9, 10, 11, 12, 13 or 14 in the corresponding two PRBs.

I a normal CP is configured, a UE does not receive in the antenna port 5 PDSCH to which VRB resource allocation distributed within a special subframe has been assigned in an uplink-downlink configuration #1 or #6.

A UE does not receive a PDSCH in the antenna port 7 to which distributed VRB resource allocation has been assigned.

If a UE does not receive all of allocated PDSCH RB, it may skip the decoding of a transport block. If the UE skips decoding, a physical layer indicates a high layer that a transport block has not been successfully decoded.

If a UE is configured by a high layer so that it decodes a PDCCH having CRC scrambled by a C-RNTI, the UE decodes the PDCCH and a corresponding PDSCH according to each combination defined in Table 10. The PDSCH corresponding to the PDCCH(s) is subjected to scrambling initialization by the C-RNTI.

If a CIF for a serving cell is configured or a UE is configured by a high layer so that it decodes a PDCCH having CRC scrambled by a C-RNTI, the UE decodes the PDSCH of a serving cell indicated by a CIF value within a decoded PDCCH.

If a UE of the transmission mode 3, 4, 8 or 9 receives DCI format 1A assignment, the UE assumes that PDSCH transmission is related to a transport block 1 and a transport block 2 is disabled.

If a UE is configured in the transmission mode 7, a UE-specific reference signal corresponding to a PDCCH(s) is subjected to scrambling initialization by a C-RNTI.

If an extended CP is used in the downlink, a UE does not support the transmission mode 8.

If the transmission mode 9 is configured for a UE, when the UE detects a PDCCH carrying the DCI format 1A or 2C intended therefor and having CRC scrambled by a C-RNTI, the UE decodes a corresponding PDSCH in a subframe indicated by a high layer parameter ("mbsfn-SubframeConfigList"). However, the UE is configured by a high layer so that it decodes a PMCH, or a PRS occasion is configured only within an MBSFN subframe and a subframe in which a CP length used in a subframe #0 is a normal CP and a subframe used as part of a PRS occasion by a high layer is excluded.

Table 10 illustrates a PDCCH and PDSCH configured by a C-RNTI.

TABLE 10

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
|  | DCI format 1 | UE-specific by C-RNTI | Single antenna port, port 0 |
| Mode 2 | DCI format 1A | Common and UE-specific by C-RNTI | Transmit diversity |
|  | DCI format 1 | UE-specific by C-RNTI | Transmit diversity |
| Mode 3 | DCI format 1A | Common and UE-specific by C-RNTI | Transmit diversity |
|  | DCI format 2A | UE-specific by C-RNTI | Large delay CDD or transmit diversity |
| Mode 4 | DCI format 1A | Common and UE-specific by C-RNTI | Transmit diversity |
|  | DCI format 2 | UE-specific by C-RNTI | Closed-loop spatial multiplexing or transmit diversity |
| Mode 5 | DCI format 1A | Common and UE-specific by C-RNTI | Transmit diversity |
|  | DCI format 1D | UE-specific by C-RNTI | Multi-user MIMO |
| Mode 6 | DCI format 1A | Common and UE-specific by C-RNTI | Transmit diversity |
|  | DCI format 1B | UE-specific by C-RNTI | Closed-loop spatial multiplexing using single transport layer |
| Mode 7 | DCI format 1A | Common and UE-specific by C-RNTI | If the number of PBCH antenna ports is 1, a single antenna port, port 0 is used, and if not, transmit diversity |
|  | DCI format 1 | UE-specific by C-RNTI | Single antenna port, port 5 |

TABLE 10-continued

| Transmission mode | DCI format | Search space | PDSCH transmission method corresponding to PDCCH |
|---|---|---|---|
| Mode 8 | DCI format 1A | Common and UE-specific by C-RNTI | If the number of PBCH antenna ports is 1, a single antenna port, port 0 is used, and if not, transmit diversity |
| | DCI format 2B | UE-specific by C-RNTI | Dual layer transmission, ports 7 and 8 or a single antenna port, port 7 or 8 |
| Mode 9 | DCI format 1A | Common and UE-specific by C-RNTI | Non-MBSFN subframe: if the number of PBCH antenna ports is 1, a single antenna port, port 0 is used, and if not, transmit diversity<br>MBSFN subframe: a single antenna port, port 7 |
| | DCI format 2C | UE-specific by C-RNTI | Layer transmission of maximum 8, port 7-14 |

If a UE is configured by a high layer so that it decodes a PDCCH having SPS CRC scrambled by a C-RNTI, the UE decodes the PDCCH of a primary cell and the corresponding PDSCH of the primary cell according to each combination defined in Table 11. If the PDSCH is transmitted without the corresponding PDCCH, the same PDSCH-related configuration is applied. A PDSCH corresponding to the PDCCH and a PDSCH not having a PDCCH are subjected to scrambling initialization by an SPS C-RNTI.

If the transmission mode 7 is configured for a UE, a UE-specific reference signal corresponding to a PDCCH(s) is subjected to scrambling initialization by an SPS C-RNTI.

If the transmission mode 9 is configured for a UE, when the UE detects a PDCCH carrying the DCI format 1A or 2C intended therefor and having SPS CRC scrambled by a C-RNTI or a configured PDSCH configured without a PDCCH intended therefor, the UE decodes the corresponding PDSCH in a subframe indicated by a high layer parameter ("mbsfn-SubframeConfigList"). In this case, the UE is configured by a high layer so that it decodes a PMCH, or a PRS occasion is configured only within an MBSFN subframe, and a subframe in which a CP length used in a subframe #0 is a normal CP and configured as part of a PRS occasion by a high layer is excluded.

Table 11 illustrates a PDCCH and PDSCH configured by an SPS C-RNTI.

TABLE 11

| Transmission mode | DCI format | Search space | PDSCH transmission method corresponding to PDCCH |
|---|---|---|---|
| Mode 1 | DCI format 1A | Common and UE-specific by C-RNTI | Single antenna port, port 0 |
| | DCI format 1 | UE-specific by C-RNTI | Single antenna port, port 0 |
| Mode 2 | DCI format 1A | Common and UE-specific by C-RNTI | Transmit diversity |
| | DCI format 1 | UE-specific by C-RNTI | Transmit diversity |
| Mode 3 | DCI format 1A | Common and UE-specific by C-RNTI | Transmit diversity |
| | DCI format 2A | UE-specific by C-RNTI | Transmit diversity |
| Mode 4 | DCI format 1A | Common and UE-specific by C-RNTI | Transmit diversity |
| | DCI format 2 | UE-specific by C-RNTI | Transmit diversity |
| Mode 5 | DCI format 1A | Common and UE-specific by C-RNTI | Transmit diversity |
| Mode 6 | DCI format 1A | Common and UE-specific by C-RNTI | Transmit diversity |
| Mode 7 | DCI format 1A | Common and UE-specific by C-RNTI | Single antenna port, port 5 |
| | DCI format 1 | UE-specific by C-RNTI | Single antenna port, port 5 |
| Mode 8 | DCI format 1A | Common and UE-specific by C-RNTI | Single antenna port, port 7 |
| | DCI format 2B | UE-specific by C-RNTI | Single antenna port, port 7 or 8 |
| Mode 9 | DCI format 1A | Common and UE-specific by C-RNTI | Single antenna port, port 7 |
| | DCI format 2C | UE-specific by C-RNTI | Single antenna port, port 7 or 8 |

If a UE is configured by a high layer so that it decodes a PDCCH having CRC scrambled by a temporary C-RNTI and is configured so that it does not decode a PDCCH having CRC scrambled by the C-RNTI, the UE decodes the PDCCH and a corresponding PDSCH according to a combination defined in Table 12. The PDSCH corresponding to the PDCCH(s) is subjected to scrambling initialization by the temporary C-RNTI.

Table 12 illustrates the PDCCH and PDSCH configured by a temporary C-RNTI.

TABLE 12

| DCI format | Search space | PDSCH transmission method corresponding to PDCCH |
|---|---|---|
| DCI format 1A | Common and UE-specific by temporary C-RNTI | If the number of PBCH antenna ports is 1, a single antenna port, port 0 is used, and if not, transmit diversity |
| DCI format 1 | UE-specific by temporary C-RNTI | If the number of PBCH antenna ports is 1, a single antenna port, port 0 is used, and if not, transmit diversity |

UE Procedure for PUSCH Transmission

A UE is semi-statically configured through higher layer signaling so that it performs PUSCH transmission signaled through a PDCCH according to any one of two uplink transmission modes of the mode 1 and 2 defined in Table 13. When the UE is configured by a high layer so that it decodes a PDCCH having CRC scrambled by a C-RNTI, the UE decodes the PDCCH according to a combination defined in Table 13 and transmits the corresponding PUSCH. PUSCH transmission corresponding to the PDCCH(s) and PUSCH retransmission for the same transport block are subjected to scrambling initialization by the C-RNTI. The transmission mode 1 is a default uplink transmission mode for the UE until the uplink transmission mode is assigned to the UE by higher layer signaling.

If the transmission mode 2 is configured for a UE and the UE receives a DCI format 0 uplink scheduling grant, the UE assumes that PUSCH transmission is related to a transport block 1 and a transport block 2 is disabled.

Table 13 illustrates the PDCCH and PUSCH configured by the C-RNTI.

TABLE 13

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |
|  | DCI format 4 | UE-specific by C-RNTI | Closed-loop spatial multiplexing |

If a UE is configured by a high layer so that it decodes a PDCCH having CRC scrambled by a C-RNTI and receives a random access procedure initiated by a PDCCH order, the UE decodes the PDCCH according to a combination defined in Table 14.

Table 14 illustrates the PDCCH configured by a PDCCH order for initiating a random access procedure.

TABLE 14

| DCI format | Search space |
|---|---|
| DCI format 1A | Common and UE-specific by C-RNTI |

If a UE is configured by a high layer so that it decodes a PDCCH having SPS CRC scrambled by a C-RNTI, the UE decodes the PDCCH according to a combination defined in Table 15 and transmits a corresponding PUSCH. PUSCH transmission corresponding to the PDCCH(s) and PUSCH retransmission for the same transport block are subjected to scrambling initialization by the SPS C-RNTI. Minimum transmission of the PUSCH and PUSCH retransmission for the same transport block without the corresponding PDCCH is subjected to scrambling initialization by the SPS C-RNTI.

Table 15 illustrates the PDCCH and PUSCH configured by the SPS C-RNTI.

TABLE 15

| Transmission mode | DCI format | Search space | Transmission method of PUSCH corresponding to PDCCH |
|---|---|---|---|
| Mode 1 | DCI format 0 | Common and UE-specific by C-RNTI | Single antenna port, port 10 |
| Mode 2 | DCI format 0 | Common and UE-specific by C-RNTI | Single antenna port, port 10 |

Regardless of whether a UE has been configured to decode a PDCCH having CRC scrambled by a C-RNTI, if the UE is configured by a high layer so that it decodes a PDCCH scrambled by a temporary C-RNTI, the UE decodes the PDCCH according to a combination defined in Table 16 and transmits the corresponding PUSCH. A PUSCH corresponding to the PDCCH(s) is subjected to scrambling initialization by the temporary C-RNTI.

If the temporary C-RNTI is set by a high layer, PUSCH transmission corresponding to a random access response grant and PUSCH retransmission for the same transport block are scrambled by the temporary C-RNTI. If not, PUSCH transmission corresponding to a random access response grant and PUSCH retransmission for the same transport block are scrambled by a C-RNTI.

Table 16 illustrates the PDCCH configured by the temporary C-RNTI.

TABLE 16

| DCI format | Search space |
|---|---|
| DCI format 0 | Common |

If a UE is configured by a high layer so that it decodes a PDCCH having CRC scrambled by a TPC-PUCCH-RNTI, the UE decodes the PDCCH according to a combination defined in Table 17. The indication of 3/3A in Table 17 includes that the UE receives the DCI format 3 or DCI format according to the configuration.

Table 17 illustrates the PDCCH configured by the TPC-PUCCH-RNTI.

TABLE 17

| DCI format | Search space |
|---|---|
| DCI format 3/3A | Common |

If a UE is configured by a high layer so that it decodes a PDCCH having CRS scrambled by a TPC-PUSCH-RNTI, the UE decodes the PDCCH according to a combination defined in Table 18. The indication of 3/3A in Table 18 includes that the UE receives the DCI format 3 or DCI format according to the configuration.

Table 18 illustrates the PDCCH configured by the TPC-PUSCH-RNTI.

TABLE 18

| DCI format | Search space |
|---|---|
| DCI format 3/3A | Common |

Relay Node (RN)

A relay node delivers data transmitted/received between an eNB and a UE through two different links (backhaul link and access link). The eNB may include a donor cell. The relay node is wirelessly connected to a wireless access network through the donor cell.

Meanwhile, in relation to the band (or spectrum) use of a relay node, a case where a backhaul link operates in the same frequency band as an access link and is called an "in-band", and a case where the backhaul link and the access link operate in different frequency bands is called an "out-band." In both the in-band and the out-band, a UE operating according to the existing LTE system (e.g., Release-8) (hereinafter referred to as a "legacy UE") is capable of accessing a donor cell.

A relay node may be divided into a transparent relay node or a non-transparent relay node depending on whether a UE recognizes the relay node. Transparent means a case where whether a UE communicates with a network through a relay node is not recognized. Non-transparent means a case where whether a UE communicates with a network through a relay node is recognized.

In relation to control of a relay node, the relay node may be divided into a relay node configured as part of a donor cell and a relay node that autonomously controls a cell.

A relay node configured as part of a donor cell may have a relay node identifier (relay ID), but does not have the cell identity of the relay node itself.

If at least part of radio resource management (RRM) is controlled by an eNB to which a donor cell belongs, although the remaining parts of the RRM are located in a relay node, it is called a relay node configured as part of the donor cell. Preferably, such a relay node may support a legacy UE. For example, various types of smart repeaters, decode-and-forward relays, and L2 (second layer) relay nodes and a type-2 relay node correspond to such a relay node.

In the case of a relay node that autonomously controls a cell, the relay node controls one cell or a plurality of cells, and a unique physical layer cell identity is provided to each of cells controlled by the relay node. Furthermore, the cells controlled by the relay node may use the same RRM mechanism. From a viewpoint of a UE, there is no difference between a case where a UE accesses a cell controlled by a relay node and a UE accesses a cell controlled by a common eNB. A cell controlled by such a relay node may support a legacy UE. For example, a self-backhauling relay node, an L3 (third layer) relay node, a type-1 relay node and a type-1a relay node correspond to such a relay node.

A type-1 relay node is an in-band relay node and controls a plurality of cells. Each of the plurality of cells seems to be a separate cell different from a donor cell from a viewpoint of a UE. Furthermore, a plurality of cells has respective physical cell IDs (this is defined in LTE Release-8), and the relay node may transmit its own synchronization channel, a reference signal, etc. In the case of a single-cell operation, a UE may directly receive scheduling information and HARQ feedback from a relay node and transmit its own control channel (scheduling request (SR), CQI, ACK/NACK, etc.) to a relay node. Furthermore, the type-1 relay node seems to be a legacy eNB (an eNB operating according to the LTE Release-8 system) from a viewpoint of legacy UEs (UEs operating according to the LTE Release-8 system). That is, the type-1 relay node has (backward compatibility. Meanwhile, from a viewpoint of UEs operating according to the LTE-A systems, the type-1 relay node seems to be an eNB different from a legacy eNB, and can provide performance improvement.

In addition to a case where the type-1a relay node operates in an out-band, it has the same characteristics as the type-1 relay node. The operation of the type-1a relay node may be configured so that an influence attributable to an L1 (first layer) operation is minimized or not present.

A type-2 relay node is an in-band relay node and does not have a separate physical cell ID and thus does not form a new cell. The type-2 relay node is transparent to a legacy UE, and the legacy UE does not recognize the presence of the type-2 relay node. The type-2 relay node may transmit a PDSCH, but does not transmit a CRS and PDCCH at least.

Meanwhile, in order for a relay node to operate in the in-band, some resources in the time-frequency space must be reserved for a backhaul link, and the resources may be configured so that they are not used for an access link. This is called resources partitioning.

A common principle in resources partitioning in a relay node may be described as follows. Backhaul downlink and access downlink may be multiplexed on one carrier frequency according to a time division multiplexing (TDM) method (i.e., only one of the backhaul downlink and access downlink is activated in a specific time). Similarly, the backhaul uplink and access uplink may be multiplexed on one carrier frequency according to the TDM scheme (i.e., only one of the backhaul uplink and access uplink is activated in a specific time).

In the backhaul link multiplexing in FDD, backhaul downlink transmission may be performed in a downlink frequency band, and backhaul uplink transmission may be performed in an uplink frequency band. In the backhaul link multiplexing in TDD, backhaul downlink transmission may be performed in a downlink subframe of an eNB and a relay node, and backhaul uplink transmission may be performed in an uplink subframe of an eNB and a relay node.

In the case of an in-band relay node, for example, if backhaul downlink reception from an eNB and access downlink transmission to a UE are performed in the same frequency band at the same time, signal interference may be generated from the reception stage of the relay node due to a signal transmitted by the transmission stage of the relay node. That is, signal interference or RF jamming may be generated from the RF front end of the relay node. Likewise, if backhaul uplink transmission to an eNB and access uplink reception from a UE are performed in the same frequency band at the same time, signal interference may be generated.

Accordingly, in order for a relay node to transmit/receive signals in the same frequency band at the same time, it is difficult to implement the simultaneous transmission if sufficient separation between a reception signal and a transmission signal (e.g., a transmit antenna and a receive antenna are sufficiently isolated geographically, such as that the transmit antenna and the receive antenna are installed on the ground/underground).

One scheme for solving such a signal interference problem is that a relay node operates to not send a signal to a UE while it receives a signal from a donor cell. That is, a gap is generated in transmission from the relay node to the UE. During the gap, the UE (including a legacy UE) may be configured to not expect any transmission from the relay node. Such a gap may be configured by configuring a multicast broadcast single frequency network (MBSFN) subframe.

Figure 18:
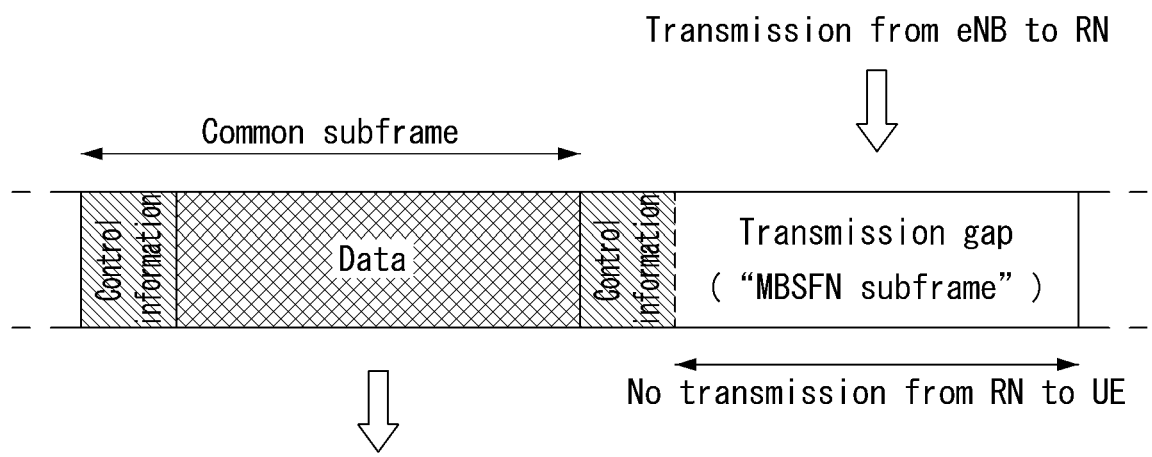
FIG. 18 illustrates a relay node resource partition in a wireless communication system to which the present invention may be applied.

FIG. 18 illustrates a structure of relay resource partitioning in the wireless communication system to which the present invention can be applied.

In FIG. 18, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subframe may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Quasi Co-Located (QCL) Between Antenna Ports

Quasi co-located or quasi co-location (QC/QCL) may be defined as follows.

If two antenna ports are in a QC/QCL relation (or subjected to QC/QCL), a UE may assume that the large-scale property of a signal delivered through one antenna port may be inferred from a signal delivered through another antenna port. In this case, the large-scale property include one or more of delay spread, Doppler spread, a frequency shift, average received power and received timing.

Furthermore, the large-scale property may be defined as follows. If two antenna ports are in a QC/QCL relation (or subjected to QC/QCL), a UE may assume that the large-scale property of a channel through which one symbol is delivered through one antenna port may be inferred from a radio channel through which one symbol is delivered through another antenna port. In this case, the large-scale property include one or more of delay spread, Doppler spread, Doppler shift, an average gain and average delay.

That is, if two antenna ports are in a QC/QCL relation (or subjected to QC/QCL), this means that the large-scale property of a radio channel from one antenna port is the same as the large-scale property of a radio channel from the remaining one antenna port. If a plurality of antenna ports in which an RS is transmitted is taken into consideration, when antenna ports in which different two types of RSs are transmitted have a QCL relation, the large-scale property of a radio channel from one antenna port may be substituted with the large-scale property of a radio channel from the other antenna port.

In this specification, the above QC/QCL-related definitions are not distinguished. That is, the QC/QCL concept may comply with one of the definitions. Or, in a similar form, the QC/QCL concept definition may be modified into a form in which transmission may be assumed between antenna ports having a QC/QCL assumption as if it is performed in the co-location (e.g., a UE may assume antenna ports transmitted at the same transmission point). The spirit of the present invention includes such similar modified examples. In the present invention, for convenience of description, the above QC/QCL-related definitions are interchangeably used.

According to the QC/QCL concept, a UE cannot assume the same large-scale property between radio channels from corresponding antenna ports with respect to non-QC/QCL antenna ports. That is, in this case, the UE must perform independent processing on each non-QC/QCL antenna port configured with respect to timing acquisition and tracking, frequency offset estimation and compensation, delay estimation and Doppler estimation.

There is an advantage in that a UE can perform the following operation between antenna ports capable of assuming QC/QCL:

With respect to delay spread and Doppler spread, the UE may apply a power-delay profile, delay spread, a Doppler spectrum, Doppler spread estimation results for a radio channel from any one antenna port to a Wiener filter used upon channel estimation for a radio channel from another antenna port in the same manner.

With respect to frequency shift and received timing, the UE may apply the same synchronization to the demodulation of another antenna port after performing time and frequency synchronization on any one antenna port.

With respect to average received power, the UE may average reference signal received power (RSRP) measurement for two or more antenna ports.

For example, if DMRS antenna ports for downlink data channel demodulation have been subjected to QC/QCL with the CRS antenna port of a serving cell, the UE can improve DMRS-based downlink data channel reception performance by likewise applying the large-scale property of a radio channel estimated from its own CRS antenna port upon channel estimation through a corresponding DMRS antenna port.

The reason for this is that an estimate regarding the large-scale property can be more stably obtained from a CRS because the CRS is a reference signal broadcasted with relatively high density every subframe and over a full band. In contrast, a DMRS is transmitted in a UE-specific manner with respect to a specific scheduled RB. Furthermore, the precoding matrix of a precoding resource block group (PRG) unit used by an eNB for transmission may be changed, and thus a valid channel received by a UE may vary in a PRG unit. Although a plurality of PRGs has been scheduled, performance deterioration may occur if the DMRS is used to estimate the large-scale property of a radio channel in a wide band. Furthermore, since a CSI-RS may have a transmission period of several~several tens of ms and a resource block has low density of 1 resource element per antenna port on average, performance deterioration may occur if the CSI-RS is used to estimate the large-scale property of a radio channel.

That is, a UE can use it for the detection/reception of a downlink reference signal, channel estimation and a channel state report by QC/QCL assumption between antenna ports.

Device-to-Device (D2D) Communication

Figure 19:
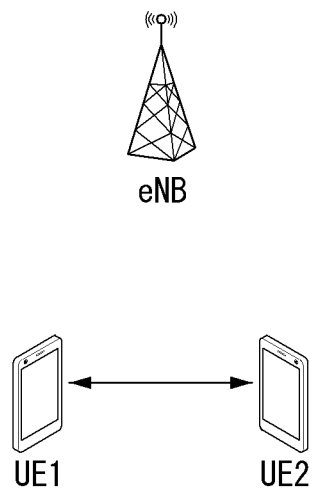
FIG. 19 is a diagram for illustrating the elements of a direct communication (D2D) scheme between UEs.

FIG. 19 is a diagram for illustrating the elements of a direct communication (D2D) scheme between UEs.

In FIG. 19, a UE means the UE of a user, and corresponding network equipment may also be taken into consideration to be a kind of UE if the network equipment, such as an eNB, transmits/receives a signal according to a communication method with the UE. Hereinafter, a UE1 may operate to select a resource unit corresponding to specific resources within a resource pool that means a set of a series of resources and to transmit a D2D signal using the corresponding resource unit. A UE2, that is, a reception UE for the UE1, receives a configuration for the resource pool in which the UE1 may send a signal, and detects the signal of the UE1 within the corresponding pool. In this case, an eNB may notify the UE1 of the resource pool if the UE 1 is located within the connection range of the eNB. If the UE1 is out of the connection range of the eNB, another UE may notify the UE1 of the resource pool or the resource pool may be previously determined to be predetermined resources. In general, the resource pool may include a plurality of resource units, and each UE may select one or a plurality of resource units and use it for its own D2D signal transmission.

Figure 20:
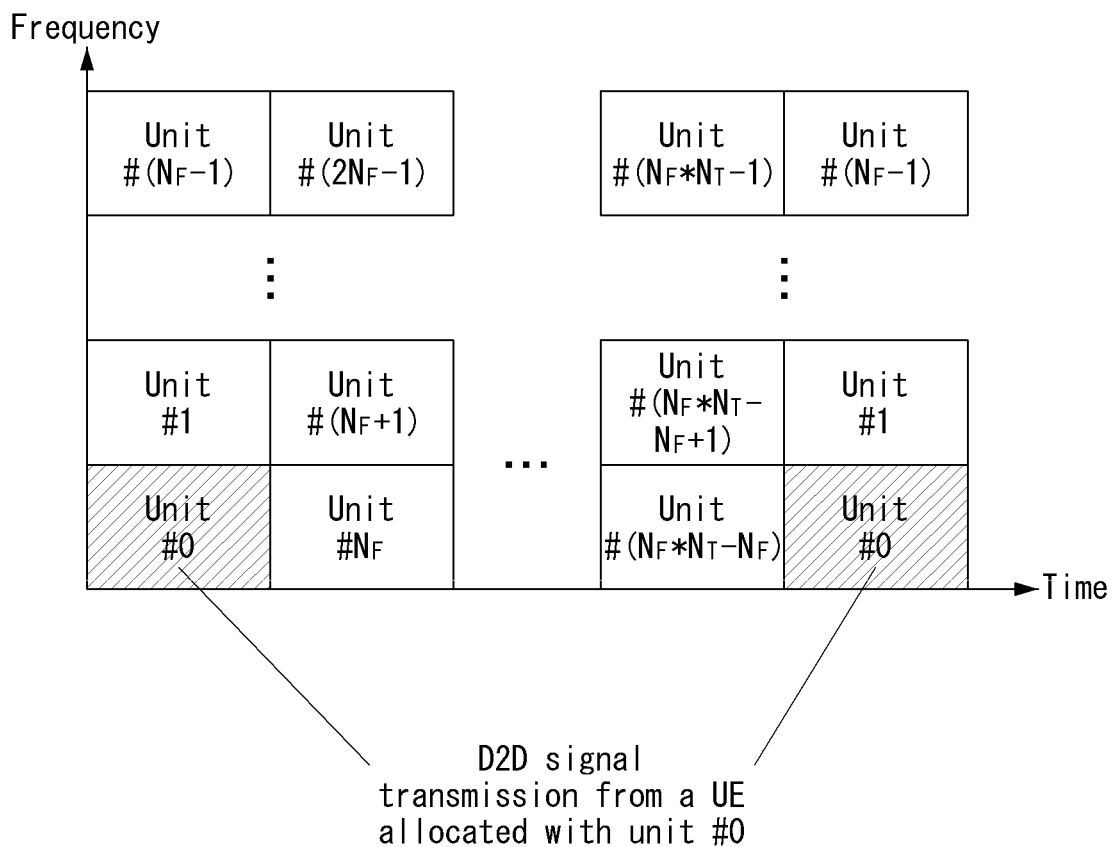
FIG. 20 is a diagram illustrating an embodiment of the configuration of a resource unit.

FIG. 20 is a diagram representing an embodiment of the configuration of a resource unit.

Referring to FIG. 20, all of frequency resources have been partitioned into N_F, all of time resources have been partitioned into N_T, and thus a total of N_F*N_T resource units may be defined. In this case, it may be expressed that a corresponding resource pool is repeated using an N_T subframe as a cycle. Characteristically, as shown in this drawing, one resource unit may periodically repeatedly appear. Or in order to obtain a diversity in a time or frequency dimension, the index of a physical resource unit to which one logical resource unit is mapped may change in a predetermined pattern over time. In such a resource unit structure, the resource pool may mean a set of resource units that a UE trying to send a D2D signal may use for transmission.

The aforementioned resource pool may be subdivided into several types. First, the resource pool may be divided depending on the contents of a D2D signal transmitted in each resource pool. For example, the contents of a D2D signal may be divided as follows, and a separate resource pool may be configured in each of the contents.

Scheduling assignment (SA): a signal including the location of resources used as the transmission of a D2D data channel used by each transmission UE, a modulation and coding scheme (MCS) necessary for the demodulation of other data channels or information, such as an MIMO transmission method and/or timing advance. The signal may be multiplexed with D2D data on the same resource unit and transmitted. In this specification, an SA resource pool may mean a pool of resources in which SA is multiplexed with D2D data and transmitted, and may also be called a D2D control channel.

A D2D data channel: a resource pool used for a transmission UE to send user data using resources designated through SA. If the resource pool may be multiplexed with D2D data on the same resource unit and transmitted, only a D2D data channel of a form other than SA information may be transmitted in a resource pool for a D2D data channel. In other words, a resource element used to transmit SA information on an individual resource unit within an SA resource pool may still be used to send D2D data in a D2D data channel resource pool.

A discovery channel: a resource pool for a message that enables a transmission UE transmits information, such as its own ID, so that an adjacent UE can discover the transmission UE.

In contrast, if the contents of a D2D signal are the same, a different resource pool may be used depending on the transmission/reception attributes of the D2D signal. For example, even in the case of the same D2D data channel or discovery message, it may be classified as a different resource pool depending on a transmission timing determination method of a D2D signal (e.g., whether the D2D signal is transmitted in the reception occasion of a synchronization reference signal or it is transmitted by applying a specific timing advance in a corresponding occasion) or a resource allocation method (e.g., whether an eNB designates the transmission resources of an individual signal for an individual transmission UE or an individual transmission UE autonomously selects individual signal transmission resources within each pool), a signal format (e.g., the number of symbols that each D2D signal occupies within one subframe or the number of subframes used for the transmission of one D2D signal), signal intensity from an eNB, and transmit power intensity of a D2D UE.

Figure 21:
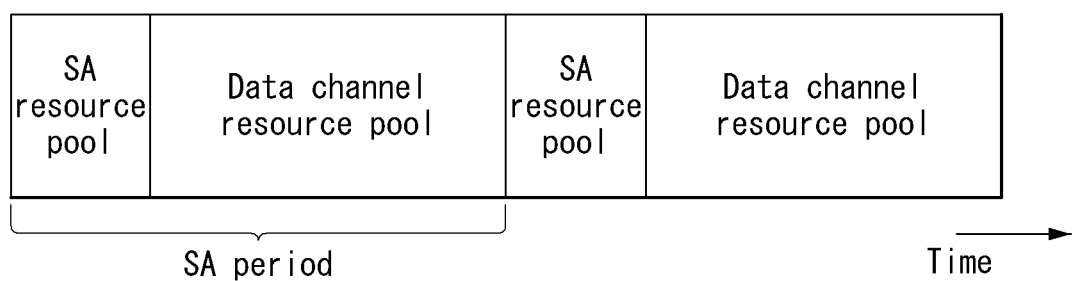
FIG. 21 illustrates a case where an SA resource pool and a following data channel resource pool periodically appear.

FIG. 21 illustrates a case where an SA resource pool and a following data channel resource pool periodically appear. Hereinafter, the period in which an SA resource pool appears is called an SA period.

The present invention provides a method of selecting resources for transmitting a relay signal when a relay operation is performed in D2D or vehicle to vehicle (V2V) communication.

In this specification, for convenience of description, a method for an eNB to directly indicate the transmission resources of a D2D transmission UE in D2D or V2V communication is called/defined as Mode 1 or Mode 3, and a method in which a transmission resource region has been previously configured or a method for an eNB to designate a transmission resource region and for a UE to directly select transmission resources is called/defined as Mode 2 or Mode 4. In the case of D2D discovery, a case where an eNB directly indicates resources is called/defined as Type 2, and a case where a UE directly selects transmission resources in a previously configured resource region or in a resource region indicated by an eNB is called/defined as Type 1.

The aforementioned D2D may also be called a sidelink. SA may be called a physical sidelink control channel (PSCCH), and a D2D synchronization signal is called a sidelink synchronization signal (SSS), and a control channel through which the most basic information is transmitted prior to ㅌ D2D communication transmitted along with the SSS may be called a physical sidelink broadcast channel (PSBCH) or a physical D2D synchronization channel (PD2DSCH) as another name. A signal used for a specific UE to provide notification that it is located nearby, in this case, the signal may include the ID of the specific UE. Such a channel may be called a physical sidelink discovery channel (PSDCH).

In D2D of Rel. 12, only a D2D communication UE has transmitted a PSBCH along with an SSS. Accordingly, the measurement of an SSS is performed using the DMRS of a PSBCH. An out-coverage UE measures the DMRS of a PSBCH, measures the reference signal received power (RSRP) of the signal, and determines whether it will become its synchronization source.

Figure 22:
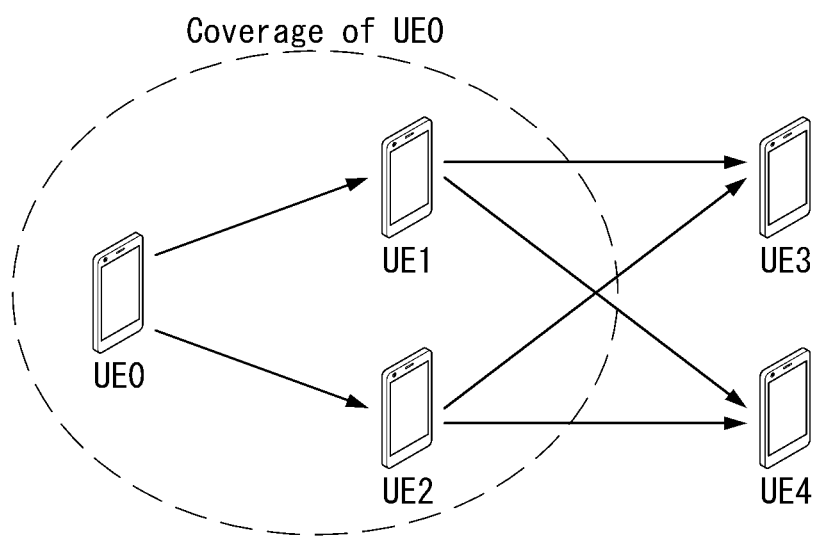
FIGS. 22 to 24 are diagrams illustrating examples of a relay process and resources for relay to which the present invention may be applied.
Figure 23:
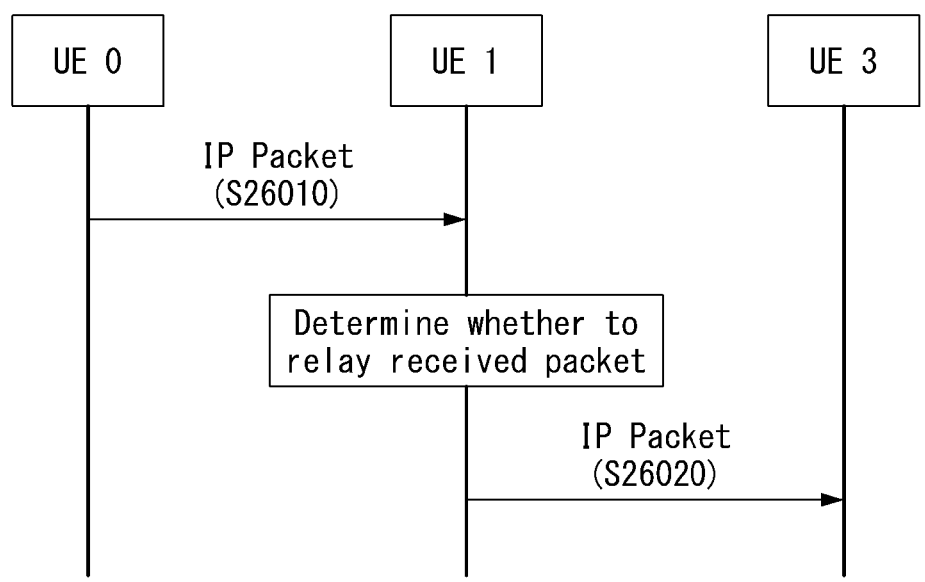
Figure 24:
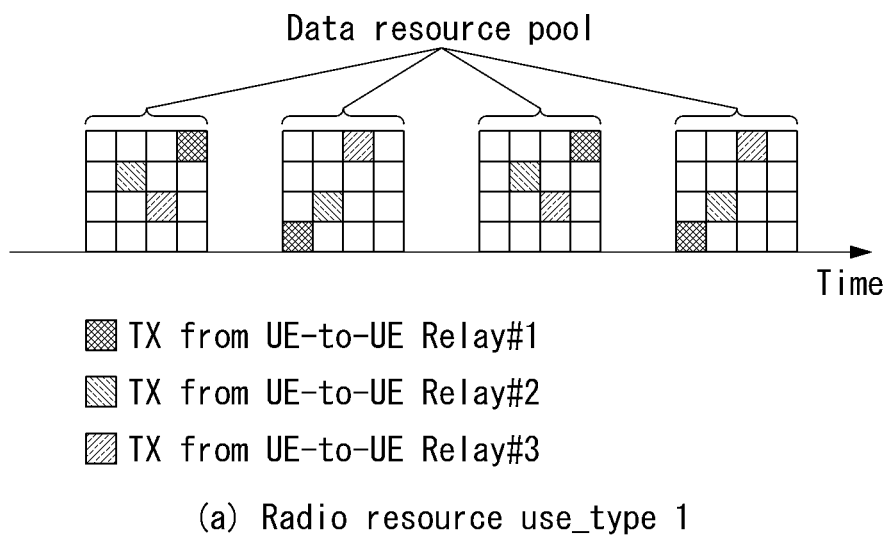
Figure 24:
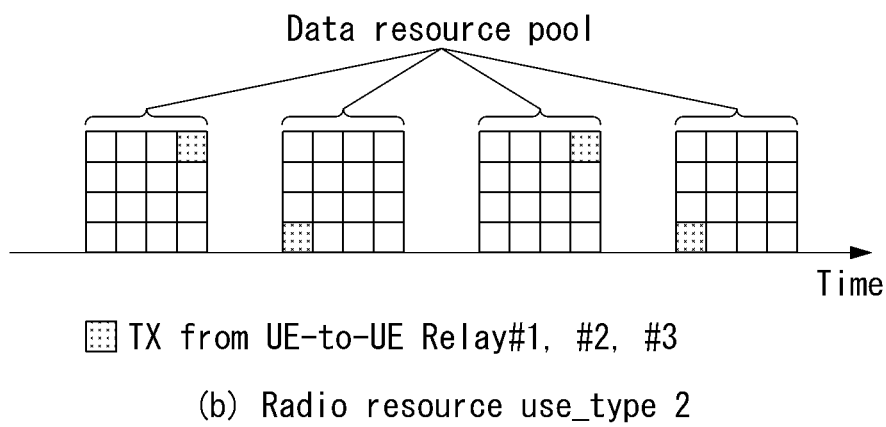

FIGS. 22 to 24 are diagrams illustrating an example of a relay process and a resource for relay according to an exemplary embodiment of the present invention.

Referring to FIGS. 22 to 24, in a communication system that supports device-to-device communication, by transmitting data to a terminal outside coverage through relay, the terminal may substantially extend coverage.

Specifically, as shown in FIG. 22, a UE 1 and/or a UE 2, which are UEs within coverage of a UE 0 may receive a message transmitted by the UE 0.

However, the UE 0 cannot directly transmit a message to a UE 3 and a UE 4 existing outside coverage. Therefore, in such a case, in order to transmit a message to the UE 3 and the UE 4 outside coverage of the UE 0, the UE 0 may perform a relay operation.

In order to transmit a message to the terminal existing outside coverage, the relay operation means an operation in which terminals within coverage transfer a message.

FIG. 23 illustrates an example of the relay operation, and when the UE 0 transmits a data packet to the UE 3 outside coverage, the UE 0 may transmit the data packet to the UE 3 through the UE 1.

Specifically, when the UE 0 transmits the data packet to the UE 3, the UE 0 sets a parameter representing whether the data packet may be relayed to execution of a relay operation and transmits the data packet (S26010).

The UE 1 receives the data packet and determines whether to relay the data packet is through the parameter.

When the parameter instructs a relay operation, the UE 1 transmits the received data packet to the UE 3, and when the parameter does not instruct a relay operation, the UE 1 does not transmit the data packet to the UE 3.

The UE 0 may transmit a message to the terminal existing outside coverage through such a method.

FIG. 24 illustrates an example of a method of selecting a resource for a relay operation.

Referring to FIG. 24(a), the terminal may autonomously select a resource in a resource pool to relay a message. That is, UEs (UE 1, UE 2, and UE 3) that relay the same message may randomly select a resource in a resource pool to relay the same message.

However, in such a case, there is a problem that a receiving terminal that receives a message repeatedly receives the same message through different resources.

Therefore, as shown in FIG. 24(b), in a resource pool, a resource for relay is allocated, and when each relay terminal transmits a message through an allocated resource, the receiving terminal may receive the same message through the same resource, thereby reducing resource waste.

The present invention proposes a method for scheduling a radio resource to a UE in a wireless communication system.

Particularly, in the present invention, a wireless communication environment is considered that Vehicle-to-Everything (V2X) communication is performed using a radio channel. The V2X includes communications between a vehicle and all types of entities such as Vehicle-to-Vehicle (V2V) referring to Communication between vehicles, Vehicle to Infrastructure (V2I) referring to communication between a vehicle and an eNB or a Road Side Unit (RSU), Vehicle-to-Pedestrian (V2P) referring to communication between a vehicle and a User Equipment (UE) belonged to an individual (a pedestrian, a bicycle rider, a vehicle driver or a passenger), and the like.

Hereinafter, in the description of the present invention, a UE may include the UE (e.g., V-UE (Vehicle UE), pedestrian UE, etc.) that performs V2X as well as a general UE. At this time, in the case that an index (e.g., V-UE type index, general UE type index, etc.) indicating the type of the corresponding UE is defined in the UE capability information, an operation of the corresponding UE may be changed depending on the index. In other words, based on the index, the corresponding UE may use the process (e.g., legacy LTE Semi-Persistent Scheduling (SPS) process) of the legacy LTE and/or the process proposed in the present invention.

In a general wireless communication environment and/or a wireless communication environment performing V2X, a UE may perform Semi-Persistent Scheduling (SPS) with an eNodeB (eNB). That is, the UE may be allocated with a resource through the SPS scheme from the eNB, and may transmit SPS data to the eNB through the allocated resource (i.e., SPS resource). However, while the UE transmits the SPS data to the eNB, a case may occur that a transmission situation (environment or status) for the SPS is changed.

For example, according to the mobility of UE, a UE may enter a specific cell or get out of a specific cell. In the case that the SPS resource information (i.e., information of the SPS resource allocated (or configured) to a UE) of the UE is shared among multiple cells and a specific UE is configured with the same resource in the multiple cells, the SPS resource is not changed while the UE moves through the multiple cells. However, in the case that the UE gets out of a cell cluster including the multiple cells, the SPS resource may be changed. On the other hand, in the case that SPS resource of UE is shared among multiple cells but a specific UE is not configured with the same resource in the multiple cells but configured with a cell-specific resource, while the UE moves through the multiple cells, the SPS resource may be changed. Here, the fact that the UE is configured with the cell-specific resource may mean that the UE is allocated with different resources with each other in different cells.

As another example, a case may be considered that a size of SPS resource is changed. Particularly, in the situation that an SPS transmission is performed according to a specific Modulation and Coding Scheme (MCS), a case may occur that a size of SPS information that the UE needs to transmit increases and more resources are required. As still another example, a case may occur that a change of SPS transmission time and/or SPS period itself is required.

In this case, the entity (i.e., SPS activation) allocated with new SPS resource or the entity (i.e., SPS release) that does not use the previously used SPS resource any more may be a UE and/or a network (entity). The network may mean a cell, an eNB, and the like. For example, like the device to device (D2D) scheme, a resource selection for vehicle to vehicle (V2V) message transmission may be directly performed by a UE (i.e., mode 2 or mode 4) or may be performed by an instruction of an eNB (i.e., mode 1 or mode 3). In the case that the eNB select a V2V resource (i.e., a resource selection is performed by an instruction of the eNB), the eNB may select a specific resource based on a request of UE or a measurement report of UE, and the like, and may indicate the selected resource.

SPS Resource Activation in eNB Indication Scheme

In the various embodiments of the present invention, in a network synchronized among eNBs and/or cells (i.e., synchronized in time and frequency aspects), a resource of UE may be commonly configured for each of the cells. In this case, all cells may be synchronized or only a part of cells (or cell cluster) may be synchronized. In the synchronized network, the SPS resource (or SPS resource set) used by a specific UE may be commonly configured among cells which is synchronized and/or in which timing information is shared. At this time, the information of the SPS resource commonly configured may be shared among the synchronized cells. Here, the SPS resource set may mean a set of SPS resources which are semi-persistently and/or periodically allocated.

In this case, the UE may select a specific cell for activating an SPS transmission, and may request the SPS activation to the selected cell. At this time, the UE may select the specific cell (i.e., a cell for performing an SPS transmission) through Reference Signal Received Power (RSRP) measurement, and the like. The specific cell may activate an SPS transmission through a UL grant for the SPS, and the activation information for the SPS transmission may be shared among the synchronized cells.

On the other hand, in a network which is not synchronized among eNBs and/or cells, in the case that a UE moves to a neighboring cell, the UE may not transmit an SPS message in accordance with transmission timing. Even in the case that an SPS resource of the UE is commonly configured in each cell, each UE may not use the SPS resource which is commonly configured in each cell. Accordingly, in the case of the network which is not synchronized among eNBs and/or cells, a specific UE may be configured with cell-specific SPS resource sets. For example, $m^{th}$ UE (UE #m) may use the cell-specific SPS resource set including the subframes represented as Table 19 below.

TABLE 19

| cell #0: (k_m+offset_m0 + n*T_sps) mod 10240 |
| cell #1: (k_m+offset_m1 + n*T_sps) mod 10240 |
| cell #2: (k_m+offset_m2 + n*T_sps) mod 10240 |
| ... |
| cell #x: (k_m+offset_mx + n*T_sps) mod 10240 |

In Table 19, 'k_m' means a subframe offset for $m^{th}$ UE, and 'offset_mx' means a subframe offset for $x^{th}$ cell (cell #x). In addition, 'n' is equal to or greater than 0, and 'T_sps' means a period for an SPS being allocated. In other words, until the SPS is released, the SPS resource may be allocated in each period of T_sps. The UE may select a specific cell for activating an SPS transmission, and request the SPS activation to the selected specific cell. At this time, the UE may select the specific cell (i.e., a cell for performing an SPS transmission) through RSRP measurement, and the like. The specific cell may activate the SPS transmission through a UL grant for the SPS, and the activation information for the SPS transmission may be shared among cells.

Even in the case of the above-described synchronous network, the method of allocating a cell-specific SPS resource set described above may be used. At this time, in the case that a subframe offset for each cell is the same, that is, the case that offset_m0=offset_m1= . . . =offset_mx may mean the case that multiple cells support the same SPS resource set.

In addition, in the various embodiments of the present invention, in the case that a size of an SPS message is changeable, according to the size of an SPS message, the SPS resource (or SPS resource set) which is used may be differently configured. In other words, according to the size of an SPS message, an SPS configuration may be differently configured. The SPS message may mean a message transmitted through the SPS scheme. The SPS resource set used according to the size of an SPS message may be as represented in Table 20 below.

TABLE 20

| s0 > N_sps : SPS resource set #0 |
| s0 ≤ N_sps < s1 : SPS resource set #1 |
| s1 ≤ N_sps < s2 : SPS resource set #2 |
| ... |

In Table 20, 'N_sps' means a size of an SPS resource (e.g., the number of Resource Blocks (RBs) for transmitting an SPS message in a specific subframe). In addition, 's0', 's1', 's2', and so on mean the configured values for determining an SPS resource set according to a size of an SPS resource. Here, 's0', 's1', 's2', and so on may be predefined, or may be forwarded through a signaling in a higher end (e.g., higher layer signaling) and/or a signaling through a physical channel (e.g., physical layer signaling).

For example, in the case that a UE transmits an SPS message of variable size in a asynchronous network, the UE may determine a size of an SPS resource based on a size of an SPS message and/or MCS, and the like to transmit, and through the determined size of the SPS resource, the UE may determine a type of an SPS resource set. In addition, the UE may also determine a type of a cell-specific SPS resource set based on RSRP measurement and the like. Through the information of two SPS resource sets, the UE may determine an SPS resource set. In the case that the type of the SPS resource set is further divided, the UE may determine an SPS resource set through more steps in addition to the two steps described above.

The UE may report the determined information described above to an eNB, and based on the reported information, the eNB may identify the timing and the resource for performing an SPS transmission with the new SPS configuration.

In addition, in the various embodiments of the present invention, in the case that multiple SPS configurations are activated in the state that multiple SPS configurations are defined, (1) The UE may be allocated with a single SPS resource (or SPS resource set), (2) The UE may be allocated with multiple SPS resources (or SPS resource sets) in the case that there is no separate release process for the SPS configuration.

In other words, in the case that multiple SPS configurations are defined, the UE may perform a single SPS process or multiple SPS processes. Here, the SPS process may mean allocation of an SPS resource or an SPS configuration. In this case, the case is assumed that an SPS resource set indicated by each SPS configuration is exclusively allocated with each other or not allocated proximately. Here, the case that the SPS resource set is not allocated proximately may mean a case that there are differences of n-subframes or more in positions of SPS resource sets for each SPS configuration, that is, a case that the SPS resource sets for each SPS configuration are discontinuously located based on a time unit which is predefined.

In the case (1), that is, the case that the UE is allocated with a single SPS resource, the UE may be allocated with the SPS resource for the SPS configuration that corresponds to higher priority among multiple SPS configurations.

Alternatively, the UE may be allocated with only the SPS resource for the SPS configuration which is newly activated. At this time, it may be considered that the SPS resource for the SPS configuration which is previously activated is released automatically (or naturally). In other words, in the case that the UE receives SPS activation through a new SPS configuration, even in the case that there is separate release request, an eNB may determine that the UE is intended to release the previous SPS configuration. At this time, the eNB may or may not transmit a signaling and/or message indicating (instructing) an SPS resource release for the existing SPS configuration to the UE.

For example, while the UE performs an SPS process, the case may be considered that an additional SPS process or a transmission of message (dynamic message) is required. This may be processed by using the scheme of being allocated with multiple SPS resources like case (2) described above. Particularly, while the UE performs an SPS process, in order to transmit greater message, an SPS configuration that enables to allocate more resources may be selected. Here, the selected SPS configuration may be defined such that SPS data may be transmitted by using an additional resource block (RB) in the position of subframe(s) used for transmitting the previous SPS data. Alternatively, the selected SPS configuration may be defined such that SPS data may be transmitted in a different position, not the position of subframe(s) used for transmitting the previous SPS data.

In addition, in the various embodiments of the present invention, like the sidelink scheme, and the like, in the case that the eNB does not receive all messages of UE persistently and/or directly, the eNB may be difficulty in identifying an SPS transmission operation (SPS transmission process) of the UE frequently. That is, in the case that the UE terminates an SPS transmission in the sidelink scheme, the UE may notify the fact of the termination of the SPS transmission through a signaling and/or message to the eNB. Alternatively, the eNB may identify the fact of the termination of the SPS transmission through monitoring and/or overhearing a sidelink communication between UEs.

As described above, in the case that multiple SPS configurations (or SPS processes) are performed, that is, activated, a performance for one or more SPS configurations may be terminated on specific timing. Here, the termination of the performance for SPS configurations may mean the case that the UE terminates an SPS transmission or no more data to transmit through the SPS is existed. At this time, the UE may report a state for an SPS configuration (i.e., state for an SPS process) by being triggered by the methods as exemplified below.

For example, in the case that the SPS transmission for a specific SPS configuration is not generated consecutively for predetermined times (e.g., n times) or more, the UE may report not to transmit the SPS data by using the release request for the specific SPS configuration and/or the specific SPS configuration to the eNB. Here, the case that an SPS transmission for the specific SPS configuration is not generated consecutively for n times or more may mean the case that the SPS data to transmit is not existed on the n times of SPS transmission opportunities.

Here, the predetermined times, that is, the n value may be a positive integer, predefined on a system, and may be forwarded through a signaling in a higher end (e.g., higher layer signaling) and/or a signaling through a physical channel (e.g., physical layer signaling). In addition, the example is described as the case that multiple SPS configurations are activated, but may also be applied to the case that a single SPS configuration is activated.

As another example, in every predetermined timing, that is, with a predetermined time interval (e.g., in every predetermined TO interval or in every SPS period in the case that all SPS configurations have the same SPS period), a state of one or more SPS configurations may be identified, and reported to the eNB simultaneously (or at once). Owing to a specific situation (e.g., handover, etc.), a situation may occur that one or more SPS configurations should be terminated simultaneously. In this case, it is inefficient to report not to transmit SPS data (i.e., SPS data transmission state) using the release request for each SPS configuration and/or the corresponding SPS configuration.

The simultaneous (or one-shot form) release request and/or the SPS data transmission state report described above may be transmitted through a separate physical channel, and may also be transmitted in the form of being piggybacked to the existing data channel.

Here, the predetermined time interval, that is, TO value may be a positive integer, and may be predefined on a system, or forwarded through a signaling in a higher end (e.g., higher layer signaling) and/or a signaling through a physical channel (e.g., physical layer signaling).

As described above, in the case that the UE transmits a report for multiple SPS configurations (SPS processes or SPS transmissions) to the eNB, the UE may transmit the report through a specific physical channel (e.g., PUCCH (Scheduling Request, SR) and/or ACK/NACK channel) to the eNB. Alternatively, the UE may transmit the report by piggybacking to a specific physical channel (e.g., piggybacking to a PUSCH channel, etc.) to the eNB. Here, the report may include a report on whether the UE transmits SPS data.

At this time, an indication for SPS Tx status intention may mean SPS Tx intention and/or SPS non-Tx intention. Here, the SPS Tx intention may mean the case that a specific SPS configuration or the SPS of a specific SPS process is transmitted, and the SPS non-Tx intention may mean the case that a message transmission for a specific SPS configuration is terminated.

Due to the characteristics of an SPS process, in the case that an indication for activation of different SPS configurations (or SPS processes) or an indication representing an SPS transmission in progress occurs more frequently, the scheme of indicating the SPS non-Tx intention may be efficient in the aspect of reducing an indication times. Different from it, in the case that an indication for release of different SPS configurations (or SPS processes) or an indication representing termination of an SPS transmission occurs more frequently, the scheme of indicating the SPS Tx intention may be efficient in the aspect of reducing an indication times.

Here, the SPS Tx status intention may mean the information indicating whether an SPS transmission in a specific SPS configuration is performed. In this case, the SPS Tx status intention may be represented as a bitmap format for each SPS configuration or a Tx status of an SPS process. That is, a Tx status may be represented by using a scheme of mapping a specific bit for a specific combination of the SPS configurations. For example, in the case that four SPS configurations are existed, 4-bit information '0001' may indicate (or represent) that an SPS transmission for SPS configuration '0' (i.e., a first SPS configuration) is in progress. Also, 4-bit information '1010' may indicate that an SPS transmission for SPS configuration '1' (i.e., a second SPS configuration) and an SPS transmission for SPS configuration '3' (i.e., a fourth SPS configuration) are in progress.

Alternatively, in the case that the eNB transmits the SPS Tx status intention selectively for a specific SPS configuration or an SPS process, the SPS Tx status intention may be transmitted by using an index value of the corresponding SPS configuration or the corresponding process, not the bitmap format described above. For example, in the case that four SPS configurations are existed, each of the SPS configurations may be indicated by using 2-bit information '00', '01', '10' and '11'. Particularly, 2-bit information '00' may indicate that an SPS transmission for SPS configuration '0' is in progress, and 2-bit information '10' may indicate that an SPS transmission for SPS configuration '2' is in progress.

As a similar method as the SPS Tx status intention described above, a method may be considered that the UE indicates that an SPS transmission may be generated for a specific SPS after a predetermined timing to the eNB in advance. For example, the UE may report an indication that an SPS transmission is going to be generated in $n^{th}$ subframe to the eNB through PUCCH ACK/NACK channel, and the like in n–$4^{th}$ subframe. As another example, the UE may notify that an SPS transmission is going to be generated through PUCCH ACK (or NACK), and notify that an SPS transmission will not be generated through PUCCH NACK (or ACK).

In the case that a UE is operating in the environment (or situation) configured as such, in addition to an indication of the SPS Tx status through PUCCH ACK/NACK in n–$4^{th}$ subframe, an uplink transmission event through another channel may be generated. In this case, the UE is required to perform a selective uplink channel transmission according to a priority as described in the following examples.

For example, after transmitting a Physical Random Access Channel (PRACH), the UE may perform a transmission of the remaining channel. Particularly, in the case that an operation such as scheduling request through a PRACH, connection (re)establishment and/or synchronization is determined to have higher priority than other operations, the UE may perform the corresponding operation through PRACH transmission preferentially.

As another example, after transmitting a Physical Uplink Shared Channel (PUSCH), the UE may perform a transmission of the remaining channel. Particularly, a PUSCH transmission for a cellular (Wireless Area Network, WAN) communication which has been performed previously may have higher priority and/or more information than a PUCCH transmission and the like of a role of an indicator for indicating only an indication for an SPS transmission (e.g., V2X SPS transmission). In this case, the UE may preferentially perform the PUSCH transmission.

As another example, after transmitting the existing legacy PUCCH ACK/NACK and/or the legacy PUCCH SR channel, the UE may perform a transmission of the remaining channel. Particularly, the uplink control channel (e.g., legacy PUCCH ACK/NACK, legacy PUCCH SR channel, etc.) transmission for a cellular (WAN) communication which has been performed previously may have higher priority and/or more information than an operation such as a PUCCH transmission of an indicator role that indicates only an indication for an SPS transmission simply. In this case, the UE may perform a transmission of the legacy PUCCH ACK/NACK channel and/or the legacy PUCCH SR channel preferentially.

As another example, after transmitting a channel for indicating the SPS Tx intention (e.g., a channel in the form of PUCCH ACK/NACK), the UE may not perform a transmission of the remaining channel. Particularly, in the case that there is no SPS Tx intention (e.g., V2X SPS Tx intention), when it is determined that an efficiency of resource may be improved such that the corresponding SPS resource is used for other use (or V2X SPS transmission, etc. may be scheduled to another UE), the UE may perform a channel transmission for indicating the SPS Tx intention preferentially.

As described above, in addition to the case of determining the top priority, for the case of the lower priorities, the method for the examples may be combined and used. For example, it may be configured that the PRACH transmission is the top priority, the PUSCH transmission is the second priority, the (legacy) PUCCH transmission is the third priority, and the channel transmission indicating the SPS Tx intention is the fourth priority, and the like. In addition, according to the importance of each channel, the priorities may be differently configured.

Furthermore, in the case that the channel indicating the SPS Tx intention (e.g., V2X SPS Tx intention indication channel) is not transmitted according to the priority rule described above, a determination (or recognition) of the eNB may be as the following examples.

For example, the eNB may have determine (or recognize) the fact that the channel (e.g., a channel indicating the V2X SPS Tx intention) is not transmitted to be the fact that the channel is unable to be transmitted inevitably according to the priority rule even though the UE may have an intention to transmit the channel. At this time, in the case that the UE has an intention to perform the SPS transmission, the UE may perform the SPS transmission without regard to whether to transmit the channel. However, although the priority for the channel transmission is the highest, the fact that other channel, not the corresponding channel, is transmitted may mean that the transmission of the channel is not performed apparently. In this case, the eNB may determine that the UE has no intention of performing the SPS transmission (e.g., V2X SPS transmission).

For another example, the eNB may determine that the UE does not perform the SPS transmission (e.g., V2X SPS transmission). In other words, the UE may not report an indication in the situation that the SPS transmission is not performed. This is because a certain overhead occurs to perform the indication.

Furthermore, in the case that a channel for indicating the SPS transmission intention is not transmitted according to the priority rule, the UE may not perform the SPS transmission in the $n^{th}$ subframe.

In the case that a simultaneous transmission of a PUCCH and a PUSCH is unavailable, the case that only the PUSCH is transmitted may mean that the UE abandons the PUCCH transmission. This may mean that the PUCCH transmission has lower priority, and the process of transmitting the information for the SPS transmission is omitted. Accordingly, even in the case that the SPS transmission is performed in the $n^{th}$ subframe, the eNB is unable to identify the SPS transmission.

Different from this, even in the case that a simultaneous transmission of a PUCCH and a PUSCH is available, according to the priority order, a power allocation for each channel may be available. For example, in the case that a part of the transmittable maximum power is allocated to a PUSCH (i.e., a channel having higher priority) and the remaining power is allocated to a PUCCH sequentially, the UE may transmit the PUCCH by using the corresponding power. At this time, in the case that it is unable to be allocated with a power of a predetermined threshold value or more, the eNB may determine that it is unable to receive the PUCCH, and the corresponding PUCCH transmission may be dropped.

Furthermore, in the various embodiments of the present invention, while the UE transmits a message periodically like the SPS scheme, the UE should transmit a message intermittently (or aperiodically) like the event-triggered scheme. Furthermore, a size of the message based on the event-triggered scheme (or an event-triggered message) may be greater than a size of the message which is periodically configured (e.g., SPS message). For example, the event-triggered message may include the data information which is greater than an average size of the message. In addition, in the case that a size of the event-triggered message is equal to or smaller than a size of the message which is periodically configured, the UE may transmit the event-triggered message using the SPS configuration which is previously configured.

In the case that a transmission of the event-triggered message is requested, in order to transmit the event-triggered message, an SPS resource set which is configured with different periods with each other and/or different message sizes with each other (e.g., an RB size in which the message is transmitted) may be configured.

For example, the different periods with each other and/or the SPS configurations configured with different periods may be defined with different priorities with each other as in the scheme described above. Particularly, a longer SPS configuration may be configured (or defined) with higher priority, and on the contrary, a shorter SPS configuration may be configured with higher priority. In other words, the SPS configuration corresponding to lower index may be configured with higher priority, and on the contrary, the SPS configuration corresponding to higher index may be configured with lower priority.

Further, without regard to the index order of the SPS configuration, according to the priority of each SPS configuration (or SPS process), a priority (e.g., Per-Packet ProSe Priority (PPPP)) may be configured for the different periods with each other and/or the SPS configurations configured with different periods. For example, in the state that the SPS configuration of shorter period (e.g., 100 ms) is activated, in the case that the SPS configuration of longer period (e.g., 500 ms) is activated, the existing SPS configuration (e.g., 100 ms) may have the lower priority.

At this time, in the case that the UE may keep (support) multiple SPS configurations or multiple SPS processes, when the SPS resource sets are exclusive with each other or not very close (e.g., in the case that there are differences of n subframes or more in positions of the SPS resource sets for each configuration), the UE may keep the multiple SPS configurations. In this case, a specific SPS configuration(s) may be selectively released implicitly or explicitly.

In other words, in the case that transmissions for SPS configurations (or SPS processes) are not overlapped on the same timing and/or the same resource, the UE may maintain the corresponding multiple SPS configurations (or the corresponding multiple SPS processes). Alternatively, even in the case that transmissions for SPS configurations (or SPS processes) are overlapped on the same timing and/or the same resource, the UE does not necessarily release a transmission for a specific SPS configuration (or a specific SPS process). In this case, the UE may release the specific SPS configuration under the necessity, or terminate the transmission for the specific SPS configuration temporarily (e.g., timing on which overlap and/or collision is expected). Particularly, the UE may maintain (or activate) the SPS configuration (e.g., an SPS transmission on the period of 500 ms) having higher priority, and may terminate (or release) the SPS configuration of lower priority only for the corresponding timing (e.g., timing on which overlap and/or collision is expected). At this time, in the case that after the specific SPS configuration (or the specific SPS process) is released, overlap and/or collision is not anticipated on the next SPS transmission timing, the UE may perform the activation process and perform the SPS transmission until a collision of the next SPS transmission occurs.

Different from this, in the case that the UE may maintain (or support) a single SPS configuration or a single SPS process, the UE may maintain (or activate) the SPS configuration (e.g., SPS transmission in 500 ms period) of higher priority on the timing on which overlap and/or collision is expected), and may release the SPS configuration of lower priority. At this time, in the case that after the specific SPS configuration is released, overlap and/or collision is not anticipated on the next SPS transmission timing, the UE may perform the activation process and perform the SPS transmission until a collision of the next SPS transmission occurs. However, since performing of the process is the same as the process of terminating the specific SPS configuration (or the specific SPS process) on the timing on which overlap and/or collision is expected temporarily, the UE may not release the SPS configuration but perform a process of terminating a transmission for the specific SPS configuration on the corresponding timing.

That is, on the timing (and/or resource) on which the SPS transmission is not overlapped, the UE may perform SPS transmissions for the SPS configuration (or SPS process) of lower priority. However, on the timing on which the SPS transmission is overlapped, the UE may perform only the SPS configuration of higher priority. For example, on the timing on which multiple SPS configurations are overlapped, the UE may perform only the SPS transmission for the SPS configuration (or SPS process) of top priority.

In addition, in the various embodiments of the present invention, multiple steps and/or additional latency may occur for the UE to determine a specific SPS resource set to use among the SPS resource sets and for the eNB to identify the specific SPS resource set determined by the UE. Accordingly, the UE may notify the information for the specific SPS resource set to the eNB implicitly, and the eNB may detect the information blindly. For example, as represented in Table 21 below, the candidates of the SPS resource sets may be mapped to partial information (e.g., Cyclic Shift (CS)) of the DMRS sequence.

TABLE 21

| |
| --- |
| s0 > N_sps : SPS resource set #0 - DMRS CS #0 |
| s0 ≤ N_sps < s1 : SPS resource set #1 - DMRS CS #1 |
| s1 ≤ N_sps < s2 : SPS resource set #2 - DMRS CS #2 |
| . . . |

In Table 21, 'N-sps', 's0', 's1', 's2', and so on, are the same as those described in Table 20. The 'DMRS CS #n' may mean a CS index. Herein, the SPS resource sets may be mapped according to various configurations (e.g., MCS, timing offset, etc.) as well as a size ('N-sps') of an SPS message.

In addition, the timing on which the SPS message is generated may be changed, and a big difference may occur between the timing on which the SPS resource set is defined and the timing on which the SPS message is generated. Owing to the difference, delay and/or drop of the SPS message may occur, and accordingly, decreasing a gap between the two timings may influence on the performance.

The subframe for configuring multiple SPS resource sets that the UE may select may be represented as Table 22 below.

TABLE 22

| |
| --- |
| resource set #0 : (offset_0 + n*T_sps) mod 10240 |
| resource set #1 : (offset_1 + n*T_sps) mod 10240 |
| . . . |
| resource set #x : (offset_x + n*T_sps) mod 10240 |

In Table 22, it is assumed the case that multiple SPS resource sets have different timing offsets with each other. The 'offset_x' means an offset for 'resource set #x', the 'T_sps' means a period in which an SPS message is transmitted, and each of the resource sets (i.e., SPS resource sets) represents a format which are shifted on the timing with each other. The corresponding offset value and/or the resource set may be determined in UE-specific manner.

At this time, in the case that a specific UE performs an SPS transmission by using a specific resource set(s) among the resource sets (i.e., SPS resource sets), the remaining resource set(s) may not be used for the specific UE. In this case, when the remaining resource set(s) is not used by other UEs, the remaining resource set(s) may not be used for the SPS transmission (although it is reserved). Accordingly, in the case that the specific UE reports the information for the specific resource set(s) used by the UE itself to the eNB, the remaining resource set(s) may be released by the eNB, and the like. In this case, the method of reporting the SPS Tx intention indication or the SPS non-Tx intention indication described above may be used.

Alternatively, a plurality of UEs may share and use the resource sets. At this time, a specific UE may report information for a specific resource set used by the UE itself, and the eNB may determine whether to use the specific resource set and whether to collide with another UE (e.g., collision related to resource use) and inform this to the specific UE. For example, the UE may inform whether to use the specific resource set (i.e., SPS Tx intention indication) through a UE-specific control channel which is closest to the transmission timing of the specific resource set (e.g., SR resource of PUCCH format 1 format and/or ACK/NACK resource). At this time, all of the differences between the offset values may be the same (e.g., offset_1–offset_0=offset_2–offset_1 . . . =offset_x–offset_(x–1)=t), and a period (e.g., P) of the control channel may be identical to the difference value (i.e., P=t). Otherwise, a period of the control channel may be smaller than the difference value (i.e., P<t). However, in the case that a period of the control channel is greater than the difference value (i.e., P>t), the resource set that may be selected by the UE through the control channel may be restricted. For example, when P=2t, the UE may select only a half of the resource sets among the whole resource sets. In the case that the eNB informs the information for a collision of the resource set to the UE, the corresponding UE may attempt to perform an SPS transmission again by using another resource set.

Figure 25:
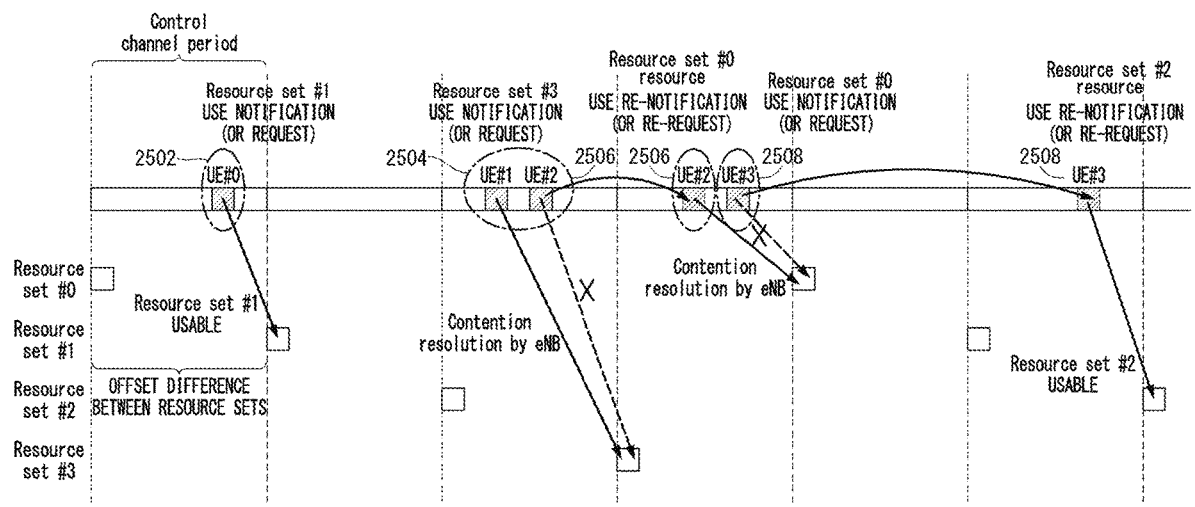
FIG. 25 illustrates an example of a method for a UE to transmit a message using a resource set, to which the present invention may be applied.

FIG. 25 illustrates an example of a method for a UE to transmit a message using a resource set, to which the present invention may be applied. FIG. 25 is illustrated only for the convenience of description, but not intended to limit the scope of the present invention.

Referring to FIG. 25, it is assumed the case that an offset difference between resource sets and a period of a control channel are the same. In addition, it is assumed the case that four UEs (UE 2502, UE 2504, UE 2506 and UE 2508) share four resource sets (a first resource set (resource set #0), a second resource set (resource set #1), a third resource set (resource set #2) and a fourth resource set (resource set #3).

First, the UE 2502 may inform (or request) information (e.g., indication information) indicating whether to use the first resource set to the eNB. Accordingly, after the eNB determine whether other UEs use the first resource set, the eNB may schedule the first resource set for the UE 2502.

Alternatively, the UE 2504 and the UE 2506 may inform information indicating whether to use the fourth resource set to the eNB. In this case, the eNB may schedule such that only one of the UE 2504 and the UE 2506 may use the fourth resource set. For example, in the case that the UE 2504 is scheduled to use the fourth resource set, the UE 2506 may request other resource set (e.g., the first resource set) to the eNB again in other period.

At this time, in the case that the UE 2508 request the other resource set on the other period (i.e., the UE 2506 and the UE 2508 request for the same resource set), the eNB may schedule such that only one of the UE 2506 and the UE 2508 may use the other resource set. In this case, the eNB may schedule the other resource set for the UE that requests again, that is, the UE 2506 preferentially. Accordingly, the UE 2508 fallen behind in the contention may request to schedule the other resource set (e.g., the third resource set) in the other period.

Through the method described above, a UE may select a required resource set among multiple resource sets and request activation to the eNB (or report whether to use the corresponding resource set).

In addition, in the various embodiments of the present invention, the methods described above may also be used for a transmission of an event-triggered message that requires a temporary resource use as well as the resource allocation of the SPS scheme. Further, the methods described above may also be used for the case to transmit a message periodically during a predetermined duration temporarily (e.g., an event-triggered message which is transmitted periodically during a predetermined duration). In order for a UE to inform (or request) a use of a resource set to an eNB, a method of using a Scheduling Request (SR) or a method of using SR and Buffer Status Report (BSR) may be considered.

First, as a scheme for a UE to inform a use of neighboring (or specific as targeted) SPS resource set through the method of using SR, a method may be considered that the UE transmits only SR to the eNB, and the UE is approved through a UL grant from the eNB. Alternatively, the eNB may designate usable SPS resource set or an index of an SPS configuration through a UL grant. The method may be used for solving the contention problem among UEs for the case that a plurality of UEs is to use the same SPS resource set (or SPS configuration) and/or the case that the corresponding SPS resource set is already used.

In addition, the contention problem may be solved by a retransmission (retrial or re-request) of the UE, not by the immediate solution by the eNB. That is, in the case that the eNB is unable to allocate (or schedule) the SPS resource set, the eNB may inform that it is unable to allocate the SPS resource set (e.g., NACK indication) through a UL grant, and the like, to the corresponding UE(s). In this case, the corresponding UE may request a resource by the method using SR by targeting the next consecutive SPS resource set. Otherwise, the corresponding UE may request a resource through a method for determining an SPS resource set which is highly probable to be allocated using the information obtained through monitoring and/or sensing in the previous duration, and using SR which is targeted to the determined SPS resource set.

Alternatively, a method may be considered that a UE informs a use of neighboring SPS resource set through the method of using SR and BSR. In this case, a method may be considered that the UE is approved through a UL grant, and the like, from an eNB by transmitting only SR to the eNB, receiving a UL grant, and the like for BSR allocation from the eNB, and then transmitting BSR. Alternatively, the UE may designate and/or map MCS to use, a size of resource, a period, an index of an SPS resource set (or SPS configuration) targeted, and the like to BSR (or a modified format of BSR) and transmit it to the eNB. At this time, in response to the BSR, the eNB configure a number of resource set and/or position and size (duration) of time/frequency of the resource, and the like. Like the method of using the SR described above, the eNB may solve the contention problem immediately, but the contention problem may also be solved through the retransmission (retrial or re-request, e.g., resource re-request using the information obtained in the previous duration) of the UE.

In addition, in the various embodiments of the present invention, in the case that UEs use the resource of the same position consecutively for a predetermined period through an SPS resource allocation, each UE may not hear the signal transmitted from other UEs (e.g., half duplex problem). For example, in the case that all UEs perform SPS transmissions in the same subframe, all of the UEs may perform transmissions of signals but may be unable to receive the signals. In order to prevent this, a method may be considered for a UE to change a part of the positions for performing the SPS transmissions, not to perform the SPS transmissions in the same position of the predetermined period always for the SPS resource set. Through this, the UE may receive the signal transmitted to other UE in a specific position.

For example, in the case that a pseudo-random sequence for changing the SPS resource set is denoted as 'PR(n)', the 'PR(n)' may be initialized by using a UE-specific identifier (ID) or a partial bit of Least Significant Bit (LSB) according to a length of pseudo-random sequence generator such as the UE-specific ID or SPS-C-RNTI.

In this case, in the case of trying to derive an index of an SPS configuration (or pattern index of an SPS resource set) from the pseudo-random sequence generator, an output length may be determined according to the pattern of the SPS configuration or the SPS resource set. In other words, when a length of the pattern (i.e., SPS resource set pattern) is 4, the length may be represented by 2 bits, and when a length of the pattern is 8, the length may be represented by 3 bits. Accordingly, the output length (bit number) may be determined according to a length of the corresponding pattern. Otherwise, even in the case that more outputs (i.e., longer length of output) are generated; the pattern value may be determined by using a partial bit of LSB of the output. Particularly, in the case of trying to change a pattern of the SPS resource set for each T subframe, the pattern value in the $n^{th}$ subframe may be represented as PR(floor(n/T)).

Alternatively, in the case of trying to derive a timing offset of the SPS resource set or the related form from the pseudo-random sequence generator, an output length may be determined according to the offset range of the SPS configuration (or SPS resource set). In other words, in the case that the offset value is changed from 0 to 63 ms (e.g., changed in a unit of 1 ms), an output corresponding to 6 bits may be derived. Particularly, in the case of trying to change an offset of the SPS resource set in each T subframe, the offset value in the $n^{th}$ subframe may be represented as PR(floor(n/T)).

The methods of activating the SPS resource described above may be applied to sidelink band based on PC5 interface using an eNB indication scheme as well as the uplink band based on Uu interface using an eNB indication scheme, Mode 1 or Mode 3. At this time, in the case that the frequency band and/or resource pool used in the sidelink band is distinguished from that of the uplink band, separate signaling and/or indicator for the eNB to indicate the frequency band and/or resource pool may be additionally considered. For example, in the case that uplink band is defined in the band (or carrier) distinguished from the uplink band, the eNB should be able to support scheduling (e.g., cross carrier scheduling) between different bands (or carriers).

SPS Resource Release in eNB Indication Scheme

When a UE moves, the resource (mode 1 resource) of the previous serving cell occupied by an SRS resource may be used for mode 1 transmission again, and the resource (mode 1 resource) of a target cell to which the UE moves is required to be allocated partially for an SPS transmission. Accordingly, each of the cells may detect release of the SPS resource and use the resource efficiently. That is, the case may be prevented that each of the cells allocates the corresponding SPS resource unnecessarily. For this, the UE may detect movement between cells, and report the detected information to the corresponding cell(s).

For example, in the case that the UE detects RSRP higher than the current serving cell for a neighboring cell, the UE may receive SPS activation from the neighboring cell. At this time, the triggering condition for release the SPS resource set from the serving cell may be represented as Equation 6 below.

$$RSRP\_serving + a \leq RSRP\_target \qquad [\text{Equation 6}]$$

In Equation 6, 'RSRP_serving' means RSRP of the serving cell, 'RSRP_target' means RSRP of the neighboring cell, and 'a' means RSRP margin. The 'a' may be configured as a negative value, 0 or a positive value.

At this time, when the triggering condition as represented in Equation 6 is satisfied, the UE may report the information releasing the SPS resource after a predetermined timing (e.g., after n-subframes) to the serving cell. Here, n value may be predefined, and may also be forwarded through a signaling in a higher end (e.g., higher layer signaling) and/or a signaling through a physical channel (e.g., physical layer signaling). Alternatively, after the UE requests activation to the target cell (or receives activation (i.e., activation indication) from the target cell), the UE may report the information that the SPS resource is released (or request SPS resource release) to the previous cell.

In addition, in the various embodiments of the present invention, in the case of the event-triggered message transmitted by using an SPS resource, after the message is transmitted with a predetermined period for a predetermined times, a transmission of the message may be terminated. At this time, the UE may be required to terminate the SPS resource allocation while terminating the SPS transmission. In addition, the UE is required to report the contents therefor to the eNB. In the case of the uplink transmission based on the Uu interface, the eNB may identify that an uplink SPS resource is released through an implicit method.

Different from this, in the case of the uplink transmission based on the Uu interface, the method may also be considered that the eNB identify that an uplink SPS resource is released through an explicit method or the eNB identify that a sidelink SPS resource is released in a sidelink transmission based on PC5 interface. In this case, the UE is required to indicate that the corresponding SPS transmission is terminated directly (or explicitly) to the eNB.

For example, when the SPS transmission is activated, the UE may inform the (repetition) transmission count of the event-triggered message to the eNB through BSR, and the like. Otherwise, the eUE may transmit the information of deadline for transmitting the corresponding event-triggered message (e.g., System Frame Number (SFN) or subframe number) to the eNB. At this time, in the case that it is certain that the UE transmits the event-triggered message for the predetermined counts, the UE may designate the information for the corresponding counts separately to the eNB. Alternatively, the transmission count of the event-triggered message may be predefined, and may be differently configured according to a type of the event-triggered message.

As another example, the UE may inform the information that a transmission (e.g., event-triggered V2X message transmission) of the event-triggered message is terminated to the eNB by using Uplink Control Information (UCI) message format. Particularly, the UE may inform the termination of the message transmission by using UE-specific PUCCH channel (e.g., SR or ACK/NACK).

As another example, the UE may inform the information that a transmission of the event-triggered message is terminated to the eNB by using SR/BSR scheme. In other words, the UE may request a scheduling end or scheduling termination, not request scheduling using the SR/BSR scheme. More particularly, the UE may map (or insert) the flag (e.g., '111') indicating the SPS transmission termination to a specific region (e.g., SPS termination field) of BSR, and transmit the BSR to the eNB. Alternatively, as a specific format of the BSR, the BSR type indicating that a size of a sidelink buffer for the event-triggered message transmission is zero may be defined. The transmission of the BSR in the specific format of the UE may represent that the UE does not require the SPS transmission any more.

In addition, in the various embodiments of the present invention, when considering the case that a specific UE moves to a neighboring cell after being located in a specific cell for a predetermined time, a serving cell may activate an SPS resource set of the specific UE, and release the SPS resource set after a predetermined time. At this time, the predetermined time (or a size of timer) may be determined by the time during which the UE is located in the cell, and the time during which the UE is located in the cell may be determined by the moving speed and/or the cell coverage of the UE. That is, the cell size may be configured variously. Accordingly, the method of determining a timer proper to the UE condition may be considered among the candidates for the timer of various sizes.

For example, in the case that a specific eNB knows all of its own position and a position of neighboring eNB(s), the specific eNB may anticipate the eNB to which the UE moves according to the position information of the UE and/or the moving direction information. In addition, the specific eNB may also anticipate the time consumed that the UE moves to the eNB using the moving speed information. The specific eNB may obtain the geographical information (i.e., position information of the UE, moving direction information of the UE, moving speed information of the UE, etc.) related to the UE using V2X (or V2V) message transmitted by the UE. Otherwise, while the UE performs signaling to request activation (i.e., activation for the SPS resource set) to the eNB, the UE may transmit the geographical information together.

Figure 26:
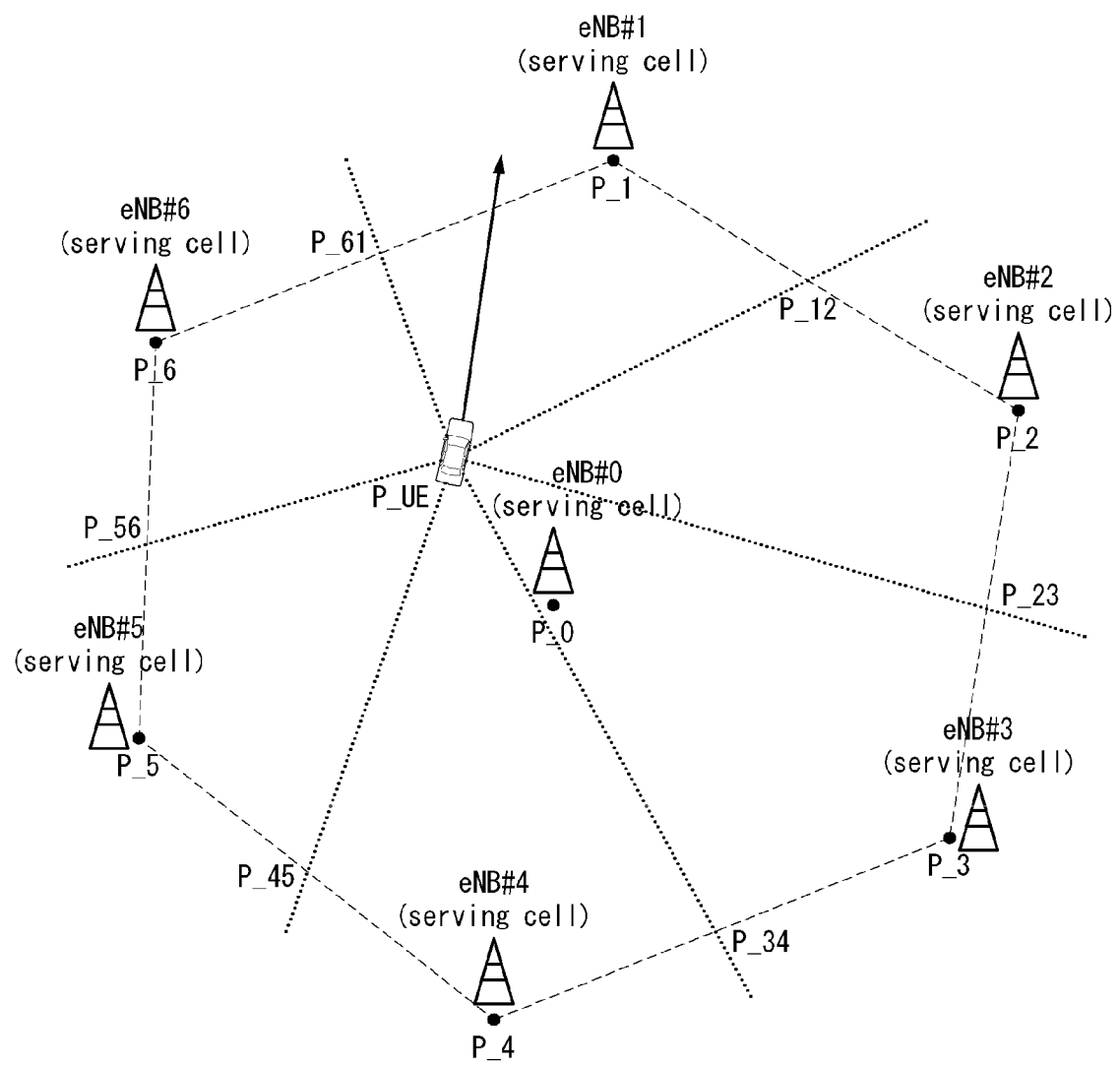
FIGS. 26 to 28 illustrate an example of a method for determining a value of a timer for releasing an SPS configuration to which the present invention may be applied.
Figure 27:
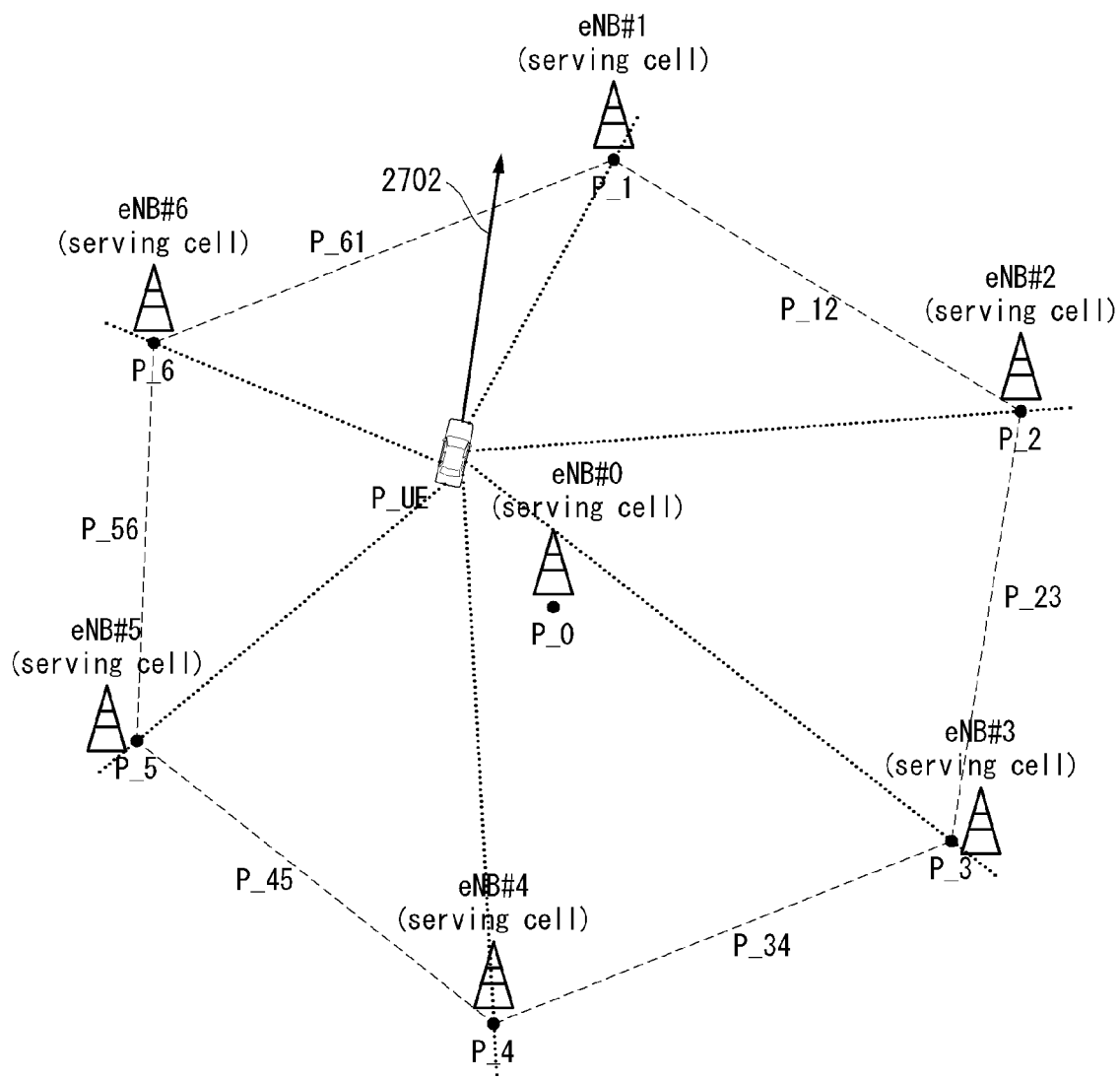
Figure 28:
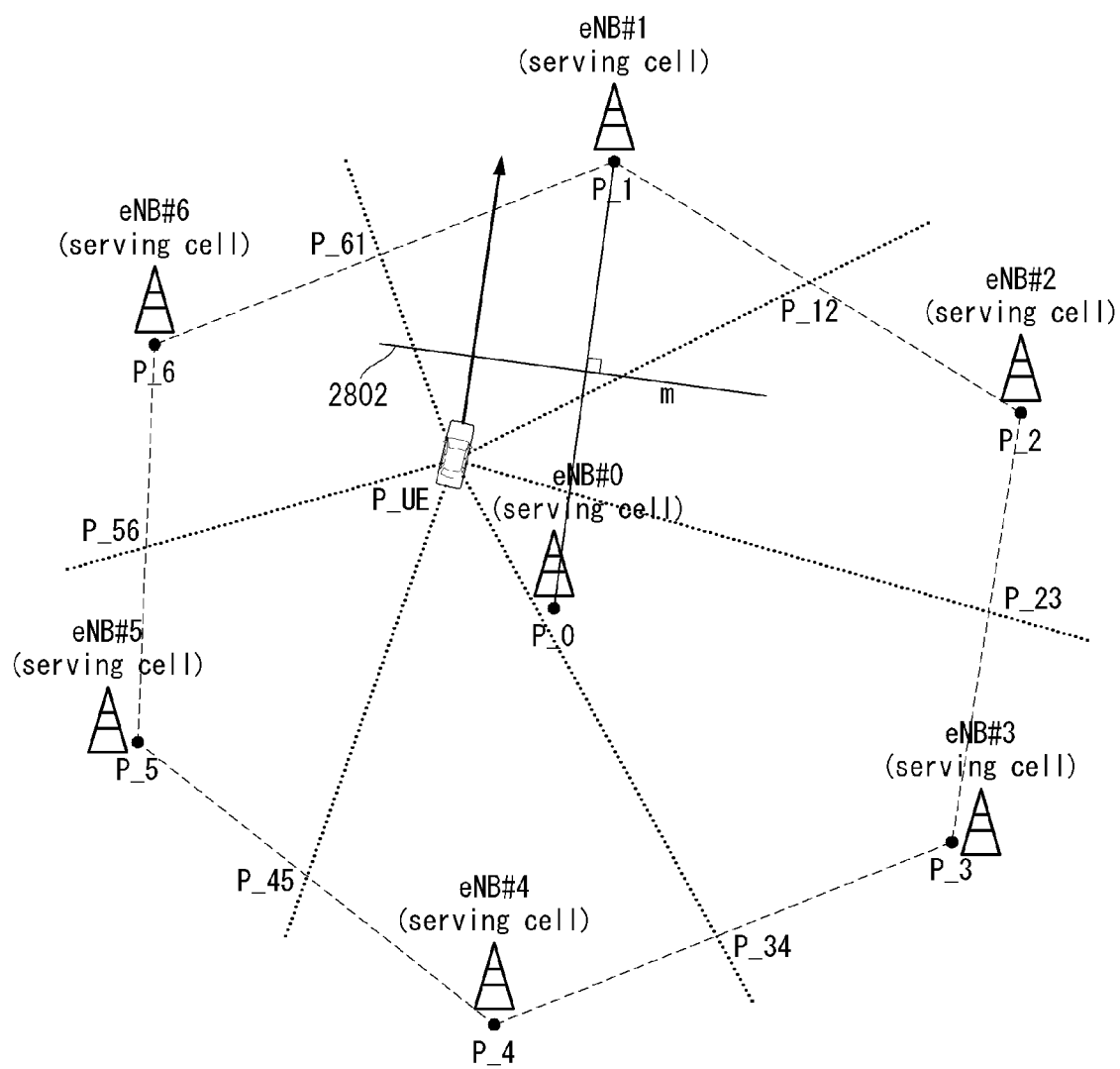

An example of the detailed scheme for the method of configuring a timer proper to the UE condition may be illustrated in FIG. 26 to FIG. 28.

FIGS. 26 to 28 illustrate an example of a method for determining a value of a timer for releasing an SPS configuration to which the present invention may be applied. FIGS. 26 to 28 are illustrated only for the convenience of description, but not intended to limit the scope of the present invention.

Referring to FIG. 28, the case is assumed that each of eNBs supports coverage of the same size, and a UE moves from the coverage of eNB#0 to the coverage of another eNB. Here, the eNBs are denoted by eNB#0, eNB#1, eNB#2, eNB#3, eNB#4, eNB#5, and eNB#6.

As shown in FIG. 26, a bisectional point of the line that connects the center of eNB#i (i.e., $i^{th}$ eNB) and eNB#j (i.e., $j^{th}$ eNB) may be represented as 'P_ij'. However, in the case that each of the eNBs does not support the coverage of the same size, the 'P_ij' may be a point of dividing the line with a proper ratio, not the bisectional point. For example, in the case that the ratio of the coverage is 2:1, the 'P_ij' may mean a point of dividing the line with 2:1 ratio.

A position of the UE 'P_UE' means a position of the UE on the timing of receiving the activation for the SPS resource set from a specific serving cell. In the case that eNB#k is existed neighboring the eNB #j, the bisectional point of the line that connects the eNB#j and the eNB#k may be denoted by 'P_jk'. At this time, in the case that a moving direction of the UE is located between an area configured by 'P_UE', 'P_ij', and 'P_jk', it may be expected that the UE moves in the direction toward eNB#j. For example, in the case that the UE (e.g., a vehicle UE) entering eNB#0, which is a serving cell, as shown in FIG. 26, is located between the area configured by 'P_UE', 'P_61', and 'P_12', it may be expected that the UE moves to the direction toward eNB#1.

Alternatively, as shown in FIG. 27, by using the correlation between a vector 2702 that shows a moving direction (direction of progress) of the UE and a vector toward the center point of each eNB, the moving direction of the UE may be anticipated. For example, the vector 2702 may be represented by Equation 7 below.

$$\overline{h}=(h_x,h_y) \quad \text{[Equation 7]}$$

Herein, $\overline{h}$ means a direction vector considering a speed, $h_x$ means a moving speed in the direction of x-axis, and $h_y$ means a moving speed in the direction of y-axis.

At this time, in the case that all of the coverage of each of the cells are the same, 'I' value may be determined, which makes the inner product of the vector 2701 and $$\frac{\overline{P_{UE}P_1}}{|\overline{P_{UE}P_1}|}$$

which is a normal vector or the projection value of the vector 2702 on the vector $$\frac{\overline{P_{UE}P_1}}{|\overline{P_{UE}P_1}|}$$

be the greatest. This may be represented as Equation 8 below.

$$\text{argmax}_i\left\{\overline{h}\cdot\frac{\overline{P_{UE}P_1}}{|\overline{P_{UE}P_1}|}\right\}, i=1,2,\ldots \quad \text{[Equation 8]}$$

According to the determined 'I' value, it is anticipated that the UE is moving toward the direction of $i^{th}$ eNB, that is, eNB#i.

At this time, as shown in FIG. 28, in the case that the RSRP margin for releasing the SPS resource set from the serving cell is 0 dB, the fact that the UE intersects the line 2802 that bisects the line connecting the current serving cell and the center of eNB#j in vertical direction (or vertical bisectional line) may be configured as the triggering condition for releasing the SPS resource. However, in the case that the RSRP margin is not 0 dB, not the vertical bisectional line 2802, but the fact that the UE intersects the line displaced in parallel with a predetermined value may be configured as the triggering condition.

Particularly, as shown in FIG. 28, considering a position of the UE (P_UE), a moving direction and a speed of the UE, the points that the UE intersects the bidirectional line (or vertical line) may be calculated (or determined) as the following procedure. Based on the value calculated according to the procedure below, the timer value described above may be configured (or selected).

First, in the case that the UE moves toward $i^{th}$ eNB (i.e., eNB#i) direction, a segment $P_0P_i$ may be represented as Equation 9 below.

$$y=\left(\frac{P_{i,y}-P_{0,y}}{P_{i,x}-P_{0,x}}\right)(x-P_{0,x})+P_{0,y} \quad \text{[Equation 9]}$$

Herein, $P_{0,x}$ and $P_{0,y}$ mean x coordinate and y coordinate of $P_0$, respectively, and $P_{i,x}$ and $P_{i,y}$ mean x coordinate and y coordinate of $P_i$, respectively.

At this time, the straight line 2802 (m) that intersects and orthogonal to the center point of the segment $P_0P_i$ may be represented as Equation 10 below.

$$y=-\left(\frac{P_{i,x}-P_{0,x}}{P_{i,y}-P_{0,y}}\right)\left(x-\frac{P_{0,x}+P_{i,x}}{2}\right)+\frac{P_{0,y}+P_{i,y}}{2} \quad \text{[Equation 10]}$$

The trace that the UE moves (in the straight line direction) of the UE positioned in the position (P_UE, $P_{UE}$) may be represented as Equation 11 below.

$$y=\left(\frac{h_y}{h_x}\right)(x-P_{UE,x})+P_{UE,y} \quad \text{[Equation 11]}$$

Herein, $h_x$ and $h_y$ mean the moving speed of the UE in x-axis direction and y-axis direction, respectively, and $P_{UE,x}$ and $P_{UE,y}$ mean x coordinate and y coordinate for each of the UE positions, respectively.

At this time, in the case that a point that the orthogonal straight line (Equation 10) and the trace of the UE (Equation 11) join is existed, the procedure and result of combining Equation 10 and Equation 11 may be represented as Equation 12 to Equation 15 below.

$$\left(\frac{h_y}{h_x}\right)(x-P_{UE,x})+P_{UE,y}= \quad \text{[Equation 12]}$$
$$-\left(\frac{P_{i,x}-P_{0,x}}{P_{i,y}-P_{0,y}}\right)\left(x-\frac{P_{0,x}+P_{i,x}}{2}\right)+\frac{P_{0,y}+P_{i,y}}{2}$$

$$\left(\frac{h_y}{h_x}+\frac{P_{i,x}-P_{0,x}}{P_{i,y}-P_{0,y}}\right)x= \quad \text{[Equation 13]}$$
$$\left(\frac{P_{i,x}-P_{0,x}}{P_{i,y}-P_{0,y}}\right)\left(\frac{P_{0,x}+P_{i,x}}{2}\right)+\frac{h_y}{h_x}P_{UE,x}+\frac{P_{0,y}+P_{i,y}}{2}-P_{UE,y}$$

$$x=\frac{\left(\frac{P_{i,x}-P_{0,x}}{P_{i,y}-P_{0,y}}\right)\left(\frac{P_{0,x}+P_{i,x}}{2}\right)+\frac{h_y}{h_x}P_{UE,x}+\frac{P_{0,y}+P_{i,y}}{2}-P_{UE,y}}{\left(\frac{h_y}{h_x}+\frac{P_{i,x}-P_{0,x}}{P_{i,y}-P_{0,y}}\right)} \quad \text{[Equation 14]}$$

$$x=\frac{h_x(P_{i,x}-P_{0,x})\left(\frac{P_{0,x}+P_{i,x}}{2}\right)+h_x(P_{i,y}-P_{0,y})\left(\frac{h_y}{h_x}P_{UE,x}+\frac{P_{0,y}+P_{i,y}}{2}-P_{UE,y}\right)}{h_y(P_{i,y}-P_{0,y})+h_x(P_{i,x}-P_{0,x})} \quad \text{[Equation 15]}$$

According to this, the time $\Delta t$ consumed until the UE arrives at the straight line which is orthogonal, that is, the boundary between the serving cell (eNB#0, for the case of FIG. 28) and neighboring cell i (eNB#1, for the case of FIG. 28) may be represented as Equation 16 below.

$$\Delta t=\left(\frac{x-P_{UE,x}}{h_x}\right) \quad \text{[Equation 16]}$$

-continued $$= \frac{(P_{i,x} - P_{0,x})\left(\frac{P_{0,x} + P_{i,x}}{2} - P_{UE,x}\right) + (P_{i,y} - P_{0,y})\left(\frac{P_{0,y} + P_{i,y}}{2} - P_{UE,y}\right)}{h_y(P_{i,y} - P_{0,y}) + h_x(P_{i,x} - P_{0,x})}$$

Accordingly, in the case that a value of more accurate timer is required, by referring to the value of Equation 16, the timer value may be configured (or selected). For example, the timer value may be configured by configuring a predetermined margin by considering a moving direction, a change of speed, an error of cell boundary position, and the like with respect to the value of Equation 16.

The calculated and/or anticipated values for the procedures described above may be changed depending on the change of the geographical information value of the UE. In order to reflect this, the method may be considered that the newly calculated timer value may be updated as a new timer value only in the case that the timer value is greater than the existing timer value by a predetermined value or more, or smaller.

That is, the release process for the Tx status indication (or Tx status intention indication) and/or the SPS configuration for the above-described SPS (multiple SPSs or selected specific SPS) configuration (or process) may be performed according to a specific triggering condition as exemplified below.

For example, in the case that the timer set based on a specific time (e.g., after the time when the SPS is activated), the release for the corresponding SPS may be triggered.

As another example, in the case that the UE is unable to satisfy the requirement for the SPS transmission, the release for the corresponding SPS may be triggered. Here, the requirement may mean latency, reliability, priority, fairness, Quality of Service (QoS), and so on.

As another example, in the case that the UE receives a notification indicating an occurrence of SPS resource collision by another UE or an eNB, the release for the corresponding SPS may be triggered.

As another example, in the case that the resource utilization (e.g., interference or collision) of a predetermined threshold value or more is sensed in the resource for the SPS transmission, the release for the corresponding SPS may be triggered.

As another example, the release for the corresponding SPS may be triggered by higher layer signaling, and the like.

As another example, in the case that the SPS transmission is not occurred consecutively for n times or more, the SPS non-Tx indication and/or the release for the corresponding SPS may be triggered. Alternatively, in the case that the SPS transmission is occurred consecutively for n times or more, the SPS Tx indication may be triggered.

As another example, in the case that the data to transmit using the SPS scheme is not existed, the SPS non-Tx indication and/or the release for the corresponding SPS may be triggered. Here, the case that the data to transmit using the SPS scheme is not existed may mean that there is no data to transmit using the SPS scheme after Ti time from the corresponding time or more than n times.

As another example, in the case that on every predetermined time (e.g., on every predetermined TO interval or on every SPS period when all SPS processes have the same SPS period), the UE may trigger the SPS Tx indication and/or the release for the corresponding SPS.

At this time, in the case of the scheme that the release for the SPS is triggered based on the timer among the examples, the UE may transmit a message for keeping activation (e.g., 'keep alive') for the corresponding SPS to the eNB before the timer is terminated. Alternatively, in the case that the UE responds to the message that the eNB transmits for identifying the status of the UE, the UE may keep the activation for the corresponding SPS and count again by resetting the timer. In addition, the timer defined for the SPS process may be independently defined for each SPS process (or SPS configuration).

In the present invention, a specific SPS process may be defined as a meaning for an SPS transmission process having a specific SPS configuration; multiple SPS processes may operate simultaneously or an SPS process may operate selectively.

Allocation of Control Channel and Data Channel for SPS Scheme

As described above, the resource set (or data channel set) of a data resource pool for the SPS data (or resource) transmission may be configured in UE-specific and/or cell-specific manner for each UE. In this case, the selected (or configured) resource set is valid until the SPS resource set is reconfigured or the resource reselection (or resource set reselection) occurs.

In addition, a scheduling assignment (SA) for data (e.g., V2X message) transmission and/or a control channel for transmitting the SA may be transmitted together. At this time, the SA for data transmission or the resource (or resource set) for transmitting the control channel may be configured as the following examples.

For example, like the resource set (or resource) of data region described above, the resource for transmitting the SA or the control channel may be configured in UE-specific and/or cell-specific manner for each UE. Particularly, in the case that a position (i.e., time offset or frequency position) of the SA resource for SPS data transmission is the same always, a reception UE may detect (or identify) the position of the resource set for the SPS data even in the case that the reception UE successfully receives only one SA among multiple SA transmission opportunities.

As another example, the UE may select the resource for transmitting the SA or the control channel autonomously. For example, the UE may select the resource for transmitting the SA or the control channel through SA energy sensing, SA decoding, random selection, and so on. That is, the reception UE may detect the SA indicating a transmission of a specific SPS data in the SA region blindly.

Figure 29:
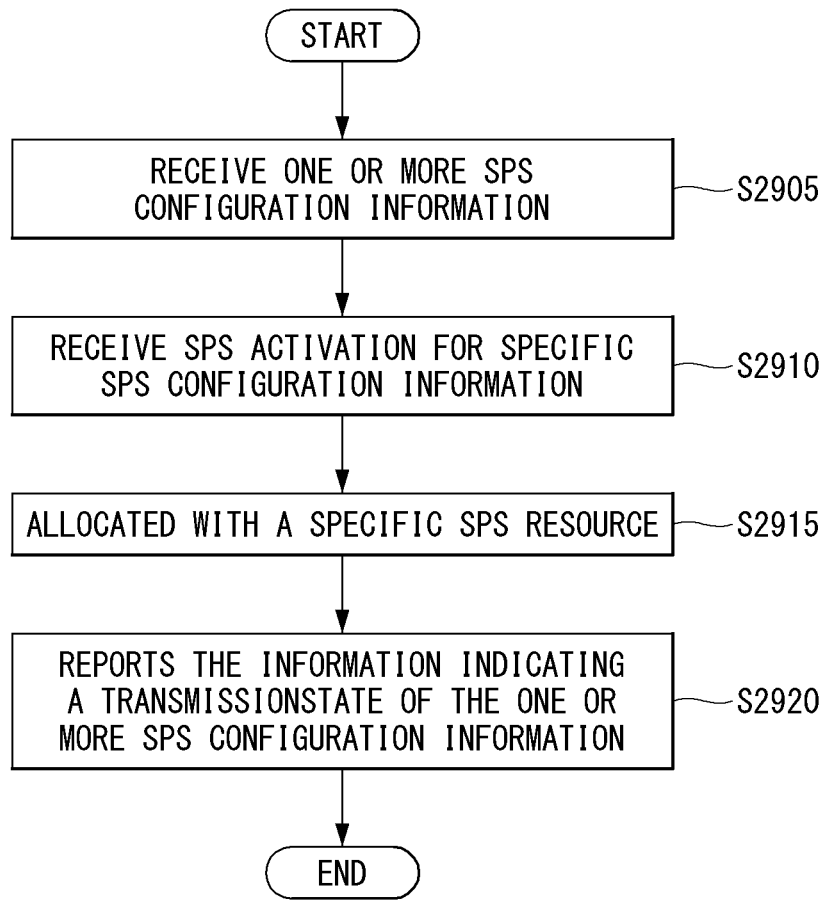
FIG. 29 illustrates a flowchart of a process of a UE allocated with a radio resource to which the present invention may be applied.

FIG. 29 illustrates a flowchart of a process of a UE allocated with a radio resource to which the present invention may be applied. FIG. 29 is illustrated only for the convenience of description, but not intended to limit the scope of the present invention.

Referring to FIG. 29, a case is assumed that a UE receives multiple SPS configuration information, is allocated with SPS resource(s) corresponding to one or more SPS configuration information, and transmits an SPS message (or data) to an eNB by using the allocated SPS resource(s). In addition, in the case of the UE that supports V2X communication, the SPS message may mean V2X SPS message.

In step S2905, the UE receives one or more Semi-Persistent Scheduling (SPS) configuration information including semi-persistent resource allocation information from the eNB. In other words, as described above, the eNB may setup a single SPS configuration or multiple SPS configurations for a specific UE.

After the UE receives the one or more SPS configuration information, in step S2910, the UE receives SPS activation for specific SPS configuration information among the one or more SPS configuration information from the eNB. Here, the SPS activation may mean an approval for the corresponding SPS configuration. At this time, the UE may receive the SPS activation for a single SPS configuration or multiple SPS configurations. That is, the UE may support a single SPS configuration or multiple SPS configurations.

After the UE receives the SPS activation, in step S2915, the UE is allocated with a specific SPS resource based on the specific SPS configuration information. Owing to this, the UE may transmit an SPS message (i.e., SPS data) to the eNB by using the allocated specific SPS resource.

When a transmission of an SPS message using the specific SPS resource is terminated, in step S2920, the UE reports the information indicating a transmission state of the one or more SPS configuration information to the eNB. Here, the information indicating the transmission status of the one or more SPS configuration information may include the information indicating the SPS Tx status intention described above or the information indicating the SPS non-Tx status intention. That is, the information indicating the transmission status of the one or more SPS configuration information may include activation indication information related to the one or more SPS configuration information or release indication information related to the one or more SPS configuration information.

In addition, the one or more SPS configuration information may be reported through at least one of a specific physical control channel or a specific physical data channel.

In addition, the information indicating the transmission state of the one or more SPS configuration information may include bitmap information for the transmission status of the one or more SPS configuration information or an index value of the SPS configuration information, as described above.

In addition, when a transmission of the SPS message using the specific SPS resource is scheduled, the UE may report the information indicating the transmission state of the one or more SPS configuration information to the eNB, before a specific time when the transmission of the SPS message is performed. At this time, when a transmission of control information or data information through another uplink channel (e.g., PUCCH, PUSCH, PRACH, etc.) is overlapped with the report, one of the transmission through different uplink channel or the report is performed according to priority.

General Apparatus to which the Present Invention May be Applied

Figure 30:
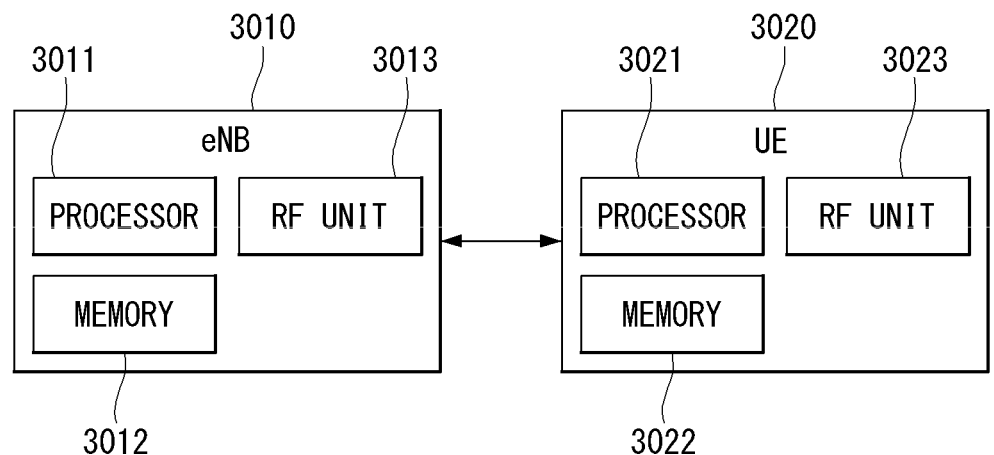
FIG. 30 illustrates a block diagram of a wireless communication apparatus according to an embodiment of the present invention.

FIG. 30 illustrates a block diagram of a wireless communication apparatus according to an embodiment of the present invention.

Referring to FIG. 30, a wireless communication system includes a network node 3010 and multiple UEs 3020.

The network node 3010 includes a processor 3011, a memory 3012 and a communication module 3013. The processor 3011 implements the functions, processes and/or methods proposed in FIGS. 1 to 29. The layers of a wired/wireless interface protocol may be implemented by the processor 3011. The memory 3012 is connected to the processor 3011 and stores various pieces of information for driving the processor 3011. The communication module 3013 is connected to the processor 3011 and transmits and/or receives wired/wireless signals. In particular, if the network node 3010 is an eNB, the communication module 3013 may include a radio frequency (RF) unit for transmitting/receiving radio signals.

The UE 3020 includes a processor 3021, a memory 3022 and a communication module (or RF unit) 3023. The processor 3021 implements the functions, processes and/or methods proposed in FIGS. 1 to 32. The layers of a radio interface protocol may be implemented by the processor 3021. The memory 3022 is connected to the processor 3021 and stores various pieces of information for driving the processor 3021. The communication module 3023 is connected to the processor 3021 and transmits and/or receives radio signals.

The memory 3012, 3022 may be located inside or outside the processor 3011, 3021 and may be connected to the processor 3011, 3021 by various well-known means. Furthermore, the network node 3010 (if it is an eNB) and/or the UE 3020 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for allocating a radio resource in a wireless communication system of the present invention, applied to 3GPP LTE/LTE-A system, is primarily described as an example, but may be applied to various wireless communication systems in addition to the 3GPP LTE/LTE-A system.

What is claimed is:

1. A method of receiving, by a User Equipment (UE), allocation of a radio resource in a wireless communication system, the method comprising:
   receiving, from a base station, one or more Semi-Persistent Scheduling (SPS) configuration information including semi-persistent resource allocation information;
   receiving, from the base station, SPS activation for specific SPS configuration information among the one or more SPS configuration information;
   receiving allocation of a specific SPS resource based on the specific SPS configuration information; and
   reporting, to the base station, information for a transmission state of the one or more SPS configuration information based on a transmission of an SPS message using the specific SPS resource being scheduled or being terminated,
   wherein the information for the transmission state of the one or more SPS configuration information based on a transmission of the SPS message resource being scheduled is reported before a specific time when the transmission of the SPS message is performed,
   wherein the information for the transmission state of the one or more SPS configuration information includes activation indication information related to the one or more SPS configuration information, or release indication information related to the one or more SPS configuration information.

2. The method of claim 1, wherein the one or more SPS configuration information is reported through at least one of a specific physical control channel or a specific physical data channel.

3. The method of claim 1, wherein the information for the transmission state of the one or more SPS configuration information includes bitmap information for the transmission state of the one or more SPS configuration information.

4. The method of claim 1, wherein the information for the transmission state of the one or more SPS configuration information includes an index value of the SPS configuration information.

5. The method of claim 1, when the wireless communication system supports vehicle to everything (V2V) communication, wherein the SPS message includes a V2V SPS message.

6. The method of claim 1, when a transmission of control information or data information through another uplink channel is overlapped with the report, one of the transmission through different uplink channel or the report is performed according to priority.

7. The method of claim 1, wherein one or more SPS resources corresponding to the one or more SPS configuration information are discontinuously located based on a time unit which is predefined therebetween.

8. A User Equipment (UE) for receiving allocation of a radio resource in a wireless communication system, comprising:
   a transceiver unit for transmitting and receiving a radio signal; and
   a processor functionally connected with the transceiver unit,
   wherein the processor is configured to:
   receive, from a base station, one or more Semi-Persistent Scheduling (SPS) configuration information including semi-persistent resource allocation information;
   receive, from the base station, SPS activation for specific SPS configuration information among the one or more SPS configuration information;
   receive allocation of a specific SPS resource based on the specific SPS configuration information; and
   report, to the base station, information for a transmission state of the one or more SPS configuration information based on a transmission of an SPS message using the specific SPS resource being scheduled or being terminated,
   wherein the information for the transmission state of the one or more SPS configuration information based on a transmission of the SPS message resource being scheduled is reported before a specific time when the transmission of the SPS message is performed,
   wherein the information for the transmission state of the one or more SPS configuration information includes activation indication information related to the one or more types of SPS configuration information or release indication information related to the one or more SPS configuration information.

9. The UE of claim 8, wherein the information for the transmission state of the one or more SPS configuration information includes bitmap information of the transmission state of the one or more SPS configuration information.

* * * * *